United States Patent [19]
Tushie et al.

[11] Patent Number: 5,889,941
[45] Date of Patent: Mar. 30, 1999

[54] SYSTEM AND APPARATUS FOR SMART CARD PERSONALIZATION

[75] Inventors: David R. Tushie, Eden Prairie; William W. Haeuser, Chaska, both of Minn.

[73] Assignee: UBIQ Inc., Minneapolis, Minn.

[21] Appl. No.: 755,459

[22] Filed: Nov. 22, 1996

Related U.S. Application Data

[60] Provisional application No. 60/015,743 Apr. 15, 1996.

[51] Int. Cl.⁶ .................................................. H04F 1/00
[52] U.S. Cl. ........................ 395/186; 257/679; 235/380
[58] Field of Search .............................. 395/186, 187.07, 395/188.01; 380/25, 23; 257/679, 922; 455/558; 902/25, 26; 235/380; 340/825.33

[56] References Cited

U.S. PATENT DOCUMENTS

| | | | |
|---|---|---|---|
| 4,772,782 | 9/1988 | Nonat | 235/380 |
| 4,825,054 | 4/1989 | Rust et al. | 235/380 |
| 4,827,425 | 5/1989 | Linden | 364/478 |
| 4,866,259 | 9/1989 | Bonnemoy . | |
| 4,874,935 | 10/1989 | Younger . | |
| 4,882,474 | 11/1989 | Anderl et al. . | |
| 5,025,399 | 6/1991 | Wendt et al. | 364/519 |
| 5,266,781 | 11/1993 | Warwick et al. | 235/375 |
| 5,332,889 | 7/1994 | Lundstrom et al. | 235/380 |
| 5,378,884 | 1/1995 | Lundstrom et al. | 235/441 |
| 5,442,165 | 8/1995 | Atsumi et al. | 235/492 |
| 5,534,857 | 7/1996 | Laing et al. | 340/825.34 |
| 5,578,808 | 11/1996 | Taylor | 235/380 |
| 5,684,742 | 11/1997 | Bublitz et al. | 365/189.01 |

*Primary Examiner*—Albert Decady
*Attorney, Agent, or Firm*—Schwegman, Lundberg, Woessner & Kluth, P.A.

[57] ABSTRACT

A smart card personalization system maintains a database containing card issuer data format templates, card applications, card operating system commands, and personalization equipment specifications and provides a centralized interface of inputs and outputs to a card issuing process which dynamically adjusts to changes in the issuing process to easily permit a card issuer to change data formats, card applications, card operating systems and/or personalization equipment in a card issuing process. The system interfaces to any card issuer management system, manages the transfer of card holder data and card applications to the particular personalization equipment used, and maintains statistics for real-time and off-line inquiries to support critical management and reporting functions. Furthermore, the system works with a variety of security methodologies to prevent fraud.

26 Claims, 18 Drawing Sheets

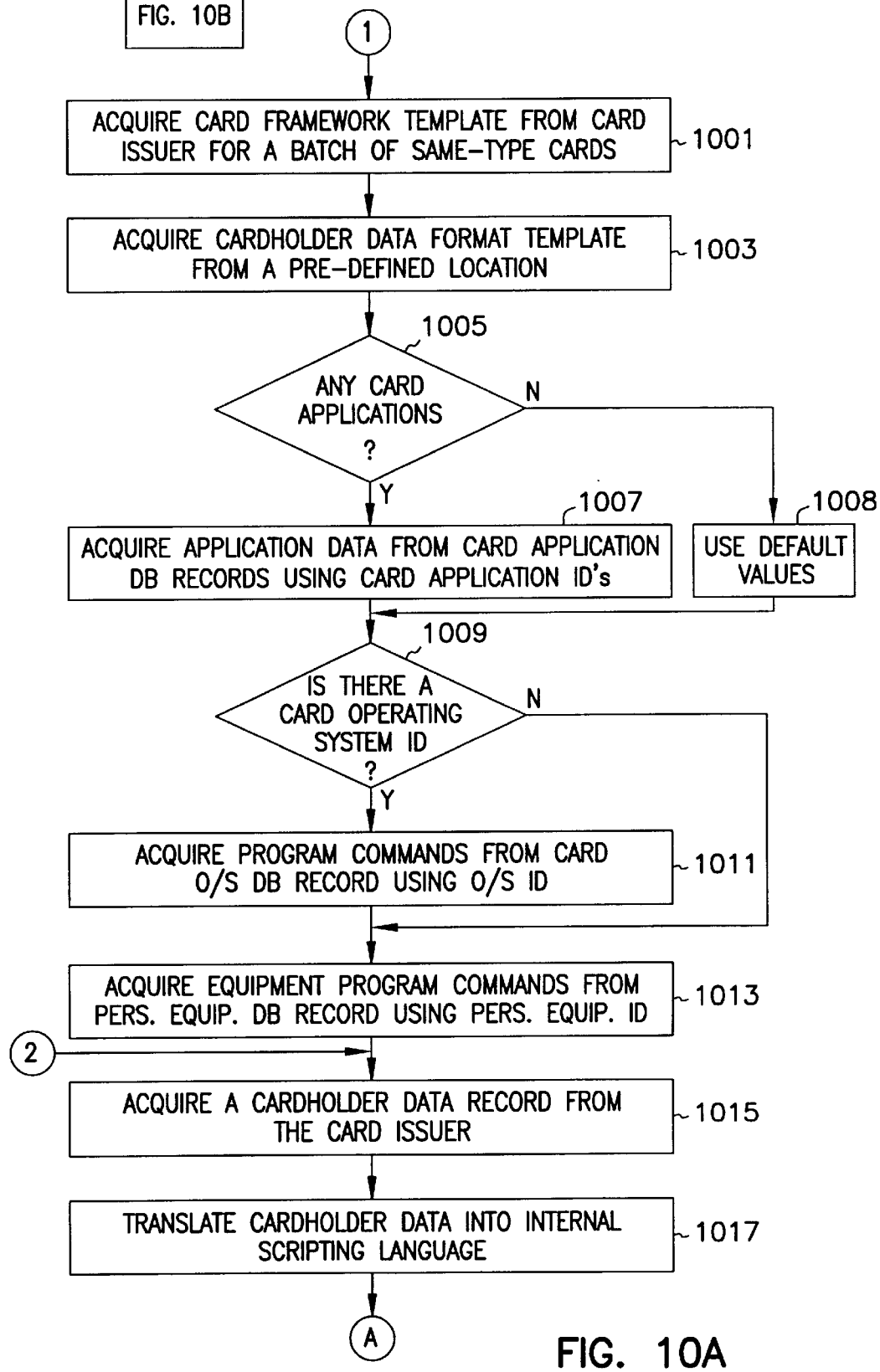

Figure 11

Card Framework Template 1102

| Chip ID | O/S ID (if present) | Master File Def. 1103 |
|---|---|---|
| 1101 | | |

| File 1 | File 2 1105 | ... | File N 1107 |

1104 — 1113

| Photo | EMName | EMAcct | ... | EMXdat 1115 |

1109 — 1111

| MSAcct | MSXdat 1119 1123 |

1117

| Application 1 | Application 2 | ... | Application M 1125 |

1121 — 1129

| Appl 2 Sec. | Appl 2 Sec. | ... | Appl M Sec. 1131 |

1127

6789
1128

- 1100

Chip Header Information
System Definitions
Printing Template
Emboss Template
Mag Stripe Template
Application Data (if present)
Sec. Functions (if present)
Personalization Equip. ID

Figure 12

Data Format Template

| Acct. No. | Name | Exp. Date |
|---|---|---|
| 1201 | 1203 | 1205 |

1200 → Cardholder Data

SAMPLE REPORT ITEMS

MATERIALS STATUS

CARD STOCK
 PART NUMBER
 ACCOUNT NAME
 PART DESCRIPTION
  PLASTIC
  MICROCONTROLLER
  MAGNETIC STRIPE
 QUANTITY ON HAND
 REORDER LEVEL
 PROJECTED NEXT
  REORDER DATE / QUANTITY
 INVENTORY RESTOCKING DATA
  RECEIVED LOT NUMBER
  VENDOR
  DATE RECEIVED
  QUANTITY
  QUALITY / REJECTS
 INVENTORY USE DATA
  JOB NUMBER
  DATE
  QUANTITY CHECKED OUT
  QUANTITY CHECKED BACK IN

FORM STOCK
 PART NUMBER
  ACCOUNT NAME
  PART DESCRIPTION
  QUANTITY ON HAND
  REORDER LEVEL
  PROJECTED NEXT REORDER
   DATE / QUANTITY
  INVENTORY RESTOCKING DATA
   RECEIVED LOT NUMBER
   VENDOR
   DATE RECEIVED
   QUANTITY
   QUALITY / REJECTS
  INVENTORY USE DATA
   JOB NUMBER
   DATE
   QUANTITY CHECKED OUT
   QUANTITY CHECKED BACK IN

| MATERIALS STATUS |
|---|
| FIG. 14A |
| SOFTWARE CONFIGURATION |
| PRODUCTION STATUS |
| FIG. 14B |

FIG. 14

SOFTWARE CONFIGURATION

CUSTOMER LIBRARY
    INTERFACE LIBRARY COMPONENT
APPLICATION LIBRARY
    KEY CARDS
    APPLICATION DATA LIBRARY COMPONENT
CARD O/S LIBRARY
    BATCH CARD
    CARD O/S LIBRARY COMPONENT
PERSONALIZATION EQUIPMENT LIBRARIES
    PERSONALIZATION DEVICES SUPPORTED

PRODUCTION STATUS
MACHINE BATCH
    BATCH ORIGINATION DATA
        ADMINISTRATION
            PARENT JOB
            OPERATOR
            DATE / TIME
            CUSTOMER
        CARD TYPE
            APPLICATIONS
                DATA
                    SECURITY REQUIREMENTS
                        STATIC
                        DYNAMIC
                OPERATING SYSTEM
                      DYNAMIC SECURITY
                      REQUIREMENTS
            PLASTIC CARD TYPE (PART NUMBER)
            NUMBER OF CARDS
        PERSONALIZATION DEVICE
            CHIP PERSONALIZATION DEVICE
            CARD PERSONALIZATION DEVICE
    PRODUCTION
        CARDS PERSONALIZED
        CARD ERRORS
            ERROR TYPE
        CARD TOTAL

FIG. 14B

SYSTEM AND APPARATUS FOR SMART CARD PERSONALIZATION

RELATED APPLICATION

This application is a non-provisional application claiming benefit under 35 U.S.C. § 119(e) of U.S. Provisional Application Ser. No. 60/015,743, filed Apr. 15, 1996.

FIELD OF THE INVENTION

The present invention is related to data storage devices and in particular to producing portable programmed data carriers such as credit cards, debit cards, identification cards, and other transaction cards.

BACKGROUND OF THE INVENTION

Increasing numbers of organizations which issue transaction cards to their users, customers, or employees require cards tailored to meet the requirements of their particular service or application. These organizations also want the cards to contain data about the card holder. Existing transaction cards encode such data in a magnetic stripe on the back of the card but the amount of data that can be held by a magnetic stripe is limited. A new type of transaction card embeds a microprocessor computer chip in the plastic of the card to greatly increase the card's data storage capacity. Additionally, sophisticated card applications specific to the card issuer can execute in certain varieties of the chips, and the chip may also contain a type of operating system. Transaction cards with embedded chips are referred to in the industry as portable programmed data carriers, more commonly called "smart cards." The chip in a smart card is programmed with initialization and/or personalization data at the same time as the surface of the card is being embossed and/or printed.

The initialization data comprises three major types of information: application data, security data, and printed data. The application data is common to all cards for a given card application and includes application program code and variables. The security data prevents fraudulent use of the card and is usually provided in the form of "secure keys." Printed data, such as a logo, bar codes, and various types of numerical information, are placed on the surface of the card. Some or all of the same data can also be embossed on the surface. Optical technology also can be employed to make part or all of the surface of the card into a storage medium with data accessible by an appropriate optical reader.

Smart cards are also programmed with information specific to an individual card holder through a process called "personalization." The personalization information for a smart card is similar to the personalization information currently contained on non-smart cards, such as the card holder's name, account number, card expiration date, and a photograph. Because of its increased storage capacity, the chip in a smart card can contain additional data beyond the basic information on the standard transaction card including a graphical representation of the individual's signature, data defining the types of service the card holder is entitled to, and account limits for those services.

The smart card issuing process must control and report on each personalized card and the results of the personalization process. Extensive report and audit files thus must be maintained to support the card tracking requirements.

Currently, a smart card issuing system must be tailored to meet the requirements of a specific card application that will be programmed on a specific type of smart card under the control of a specific card operating system and to format the data for the card to be compatible with a specific type of personalization equipment chosen to issue the card. The entire issuing system must be re-configured whenever any one of these variables (issuer application, smart card/card operating system, and/or personalization equipment) is changed, increasing the time and cost incurred by the issuer of the card in delivering personalized smart cards to its customers. Additionally, many of the current issuing systems lack a viable means to provide dynamic feedback regarding the status of any particular batch of cards in the process to the card issuer.

Furthermore, the smart card issuing systems in use today utilize a proprietary approach developed by either the card manufacturer or the personalization equipment manufacturer. To encourage sales of their respective cards or equipment, each manufacturer develops a unique personalization solution for a particular card application, and each solution is specific to a particular card issuer. These unique solutions are intended to optimize performance of the cards or equipment and thus do not permit a more inclusive, generalized personalization process that accepts any card operating system and/or work with any personalization equipment.

As the demand for smart cards increases, a smart card issuing system which permits the card issuers to use any type of personalization equipment to handle multiple types of smart cards, and their attendant operating systems, and to embed the issuers' specific card applications along with the required card holder data in any of the various types of smart cards is required.

SUMMARY OF THE INVENTION

A smart card personalization system maintains a database containing card application data, issuer format template data, card operating system data, and personalization equipment data to permit a card issuer to dynamically change card applications, card and card operating systems, and/or personalization equipment in a card issuing process without the necessity of modifying the card issuer's interface to the issuing process.

The smart card personalization system issues portable programmed data carriers, or smart cards, by first acquiring a data format identifier, a card operating system identifier, a personalization equipment identifier, an application program identifier or identifiers, and personalization data for a card holder from a card issuer management system. The identifiers permit the system to address data stored in a data structure, such as a database, and specify the particular data needed by the system for each card to be issued. Because each card issuer formats its personalization data differently and may have multiple data formats, the smart card personalization system has a database of data format templates that enable it to interface with multiple card issuer management systems. The system acquires the format template defining the personalization data used by a particular card issuer from a record in the database identified by the data format identifier. The system uses the data format template to translate the personalization data from the card issuer's format into an internal format recognized by the components of the system. The system uses the card operating system identifier and application program identifier(s) to acquire programming control commands for an operating system pre-loaded in a microprocessor chip embedded in the card, and application data, in the form of code and/or variables, for an application program type or types from the database.

The system also acquires the equipment characteristic data for the personalization equipment to be used to issue the smart card using the personalization equipment identifier. Once the system has acquired all the data necessary to issue the smart card it transfers the programming control commands, the application code and variables, and the translated personalization data to the personalization equipment as specified by the equipment characteristic data.

Alternatively, no data format identifier is passed by the card issuer because the data format template is derived from data in the application data record or because the format of the personalization corresponds on a one-to-one basis with the internal format used by the system. The card issuer may also substitute the data format template record for the data format identifier so the system does not need to reference its database of format records.

Another feature of the smart card personalization system is its card management function. The smart card personalization system collects information regarding the card issuing process and reports this information to the card issuer management system.

Smart cards may include one or more "secure keys" that are programmed into the chip to prevent fraudulent use of the card. The appropriate secure key data is obtained by the smart card personalization system from secure key records maintained by the card issuer, or another security source, and then transferred to the personalization equipment. The security source also provides security functions that are used by the smart card personalization system to ensure the integrity and secrecy of data during the transmission of data to and from the system and within the system during the smart card personalization process.

The smart card management system performs the functions described above through a series of software modules executing on a computer or multiple computers. One module is a card issuer management system interface which acquires the data format identifier, the card operating system identifier, the personalization equipment identifier, the application program identifier(s), and the personalization data for a card holder from the card issuer management system. The card issuer management system interface then uses the data format identifier to acquire the format template that defines the personalization data and translates the personalization data into the common, internal data format. A card operating system interface module acquires the programming control commands for the card operating system type specified by the card operating system identifier. A card application interface module uses the application program identifier(s) to determine which type(s) of application program is to be placed on the card and acquires the specified application code and variables. A personalization equipment interface module is responsible for the acquisition of the equipment characteristic data for the personalization equipment type specified by the personalization equipment identifier, and further for transferring the programming control commands, the application code and variables, and the translated personalization data to the personalization equipment in accordance with the requirements stipulated by the equipment characteristic data.

The reporting and security functions are provided by a tracking/report module and by a secure key management module.

The smart card personalization system uses an underlying data structure, such as a database, residing in a computer storage medium to organize the data necessary to issue the smart cards. The data structure comprises several different types of data elements and uses "indices" or "identifiers" to quickly access specific data. There are four main data elements in the system: a data format element, a card operating system element, an application program element, and a personalization equipment element.

The data format element contains a template that defines the format of the personalization data used the card issuer. The data format element may be stored in a database containing data format elements for various card issuer and the information stored in the data format element is accessed through the data format identifier. Alternatively, the data format element may be derived at the time the card is issued from data in the application program element(s) so that the application program identifier(s) passed by the card issuer identify the data format. When the data format of the personalization data corresponds exactly to the internal format used by the smart card personalization system, the data format template is logically implied which creates a virtual data format element for the issuing process.

The card operating system element holds the programming control commands that direct the card operating systems controlling a smart card chip and is accessed through the card operating system identifier.

The application program element(s) contains application data, such as program code and variables, required by the applications associated with various card issuers; application data is accessed through an application program identifier(s).

Operating parameters for various types of personalization equipment used to issue smart cards are stored in the personalization equipment element and accessed through a personalization equipment identifier corresponding to the type of the personalization equipment to be used during an issuing run.

Special configurations of the smart card personalization system support card issuers that do not need the full flexibility of the system described above.

The smart card personalization system addresses the weakness in the prior art by providing a centralized interface of inputs and outputs to the smart card personalization process which is designed to dynamically accommodate changes in the issuing process. The system interfaces to any issuer management system, manages the transfer of card holder data and card applications to the particular personalization equipment used, and collects statistics for real-time and off-line inquiries to support critical management and reporting functions. The system maintains a database of issuer data formats, card operating systems, card application programs, and types of personalization equipment. This database enables the system to handle any combination or permutations of the data, thus improving cost and time to market for the issuer. Furthermore, the system interfaces with various card security methodologies to reduce fraud.

BRIEF DESCRIPTION OF THE DRAWINGS

FIG. 11 is a data field chart for a card framework template record used by the embodiment of the smart card personalization system shown in FIG. 9.

FIG. 12 is a data field chart for a data format template record used by the embodiment of the smart card personalization system shown in FIG. 9.

FIGS. 14, 14A, 14B represent a report format showing sample items tracked by the smart card personalization system.

DESCRIPTION OF THE EMBODIMENTS

Figure 1A:
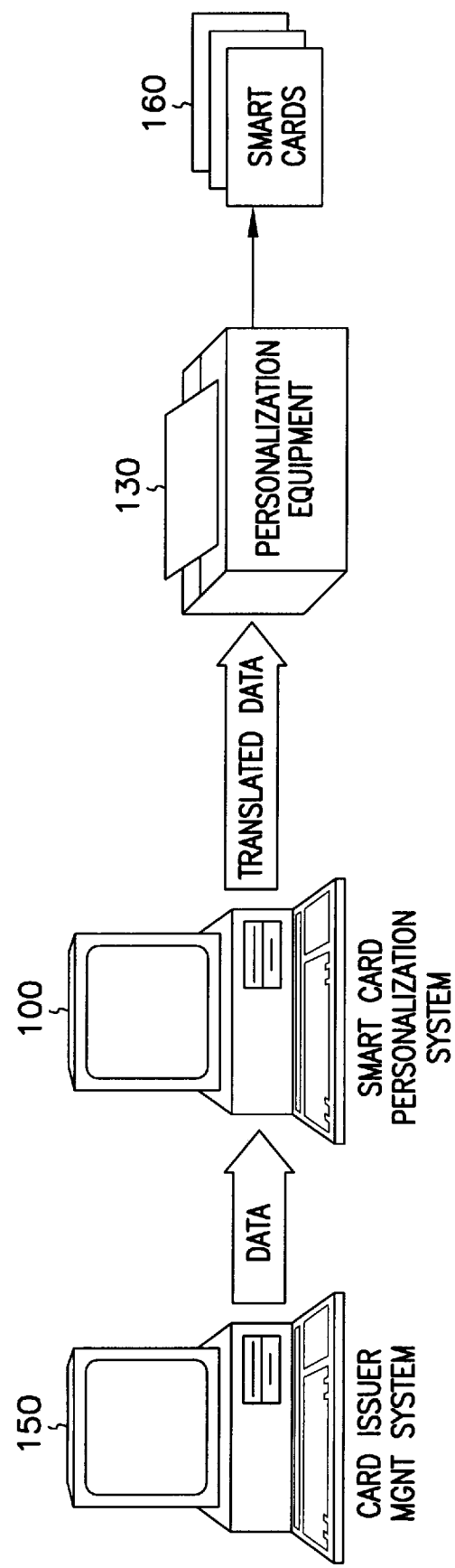
FIG. 1A is a block diagram representing a smart card issuing process that incorporates a smart card personalization system.

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of the reference numbers in the Figures usually correspond to the figure number, with the exception that identical components which appear in multiple figures are identified by the same reference numbers.

Issuing Smart Cards

Standard transaction cards such as regular credit cards are familiar to most people. A transaction card usually has information about the card holder, such as name and account number, printed and/or embossed on the surface of the card. Transaction cards frequently contain a magnetic stripe which is encoded with card holder data as well. The process of printing/embossing/encoding the card holder data on each transaction card is known as "personalization." Each transaction card also undergoes a process known as "initialization" in which certain types of information common to all cards in a batch, such as an issuer identifier and batch number, are placed on the card.

A smart card differs from a standard transaction card in that a computer microprocessor chip is embedded in the plastic of the card to greatly increase the card's data storage capacity. In some varieties of smart cards, the card manufacturer pre-loads the chip with one of several possible card operating systems and the operating system controls the programming of the chip during the personalization process. Additionally, sophisticated card applications specific to the card issuer may execute in certain varieties of the chips.

The initialization data for a smart card comprises three major types of information: application data, security data, and printed data. The application data is common to all cards for a given card application and includes application program code and variables that are programmed into the chip. The security data, usually provided as secure keys or security functions, validates the data on the card and prevents fraudulent use of the card. Printed data, such as a logo, bar codes, and various types of numerical information, are printed on the surface of the card. Some or all of the same data may also be embossed on the surface. Optical technology also may be employed to make part of the surface of the smart card into a storage medium with data accessible by an appropriate optical reader.

The personalization information for a smart card is similar to the personalization information currently contained on non-smart cards, such as the card holder's name, account number, card expiration date, and a photograph. Because of its increased storage capacity, the chip in a smart card may contain additional data beyond the basic information on the standard transaction card including a graphical representation of the individual's signature, data defining the types of service the card holder is entitled to, and account limits for those services.

Smart Card Personalization System

FIG. 1A shows components of a smart card issuing process that incorporates an embodiment of the smart card personalization system of the present invention. The smart card personalization system 100 receives data from a card issuer management system 150 (typically proprietary to the card issuer), translates the data into a data stream, and outputs the data stream to personalization equipment 130 which personalizes the smart cards 160. The card issuer management system 150 manages the card holder data and determines the type of card to issue, the card applications to embed in the card, and what personalization equipment to use to issue the card for a particular card holder. The card issuer management system is frequently a computer program as illustrated in FIG. 1A, but the smart card personalization system 100 is capable of receiving data from alternate inputs, such as a person inputting the data from a telephone keypad.

The smart card personalization system 100 is illustrated in FIG. 1A as a software program executing in a computer. As described below, the smart card personalization system 100 accesses database records which define various types of cards and card operating systems, card applications, and personalization equipment. The logical functions of the software and the database may be distributed among computers in a client/server network or centralized into a single processor. The functions may also be distributed across processors connected through standard local area networks, wide area networks, dedicated phone lines or other communication means used to loosely couple processors. The software program executes under an operating system such as Unix, Windows 95©, or Windows NT©, and on industry-standard workstation and/or personal computer hardware.

The system 100 controls card printers, embossing devices, and integrated or add-on smart card interface devices collectively represented in FIG. 1A as personalization system 130. Personalization equipment 130 also represents such devices as large volume card printer/embossers, small volume card printer/embossers, automatic teller machiners (ATMs), point of sale terminals, unattended kiosks, personal computers, network computers, and on-line telecommunication devices. Because of their investment in existing non-smart card personalization equipment, many card issuers do not purchase entirely new smart card personalization equipment but instead augment their existing personalization equipment with a smart card interface device which programs the chip in the card while the older device performs the printing and embossing functions. In such a configuration, the computer system executing the smart card personalization system 100, or "host," may be physically connected to both devices or to only one of the devices. In the latter case, the host controls the directly-connected device and has a logical connection to the other. The physical connection between the devices and the host varies according to the manufacturer and model of the device. Common industry standard connections include serial RS232, SCSI (Small Computer System Interface), Ethernet, and serial TTL (Transistor-Transistor Logic). In addition, some devices require a proprietary bus connection.

The connections between the smart card personalization system 100 and the card management system 150 and the devices 130 may also be implemented through standard local area networks, wide area networks, dedicated phone lines, or other remote communication infrastructure used to transfer data. The use of such remote connections when personalizing smart cards is described in U.S. Pat. No. 5,524,857 issued on Jul. 9, 1996, to Laing, et al. Alternate connections will be apparent to those skilled in the art and are within the scope of the invention.

Figure 1B:
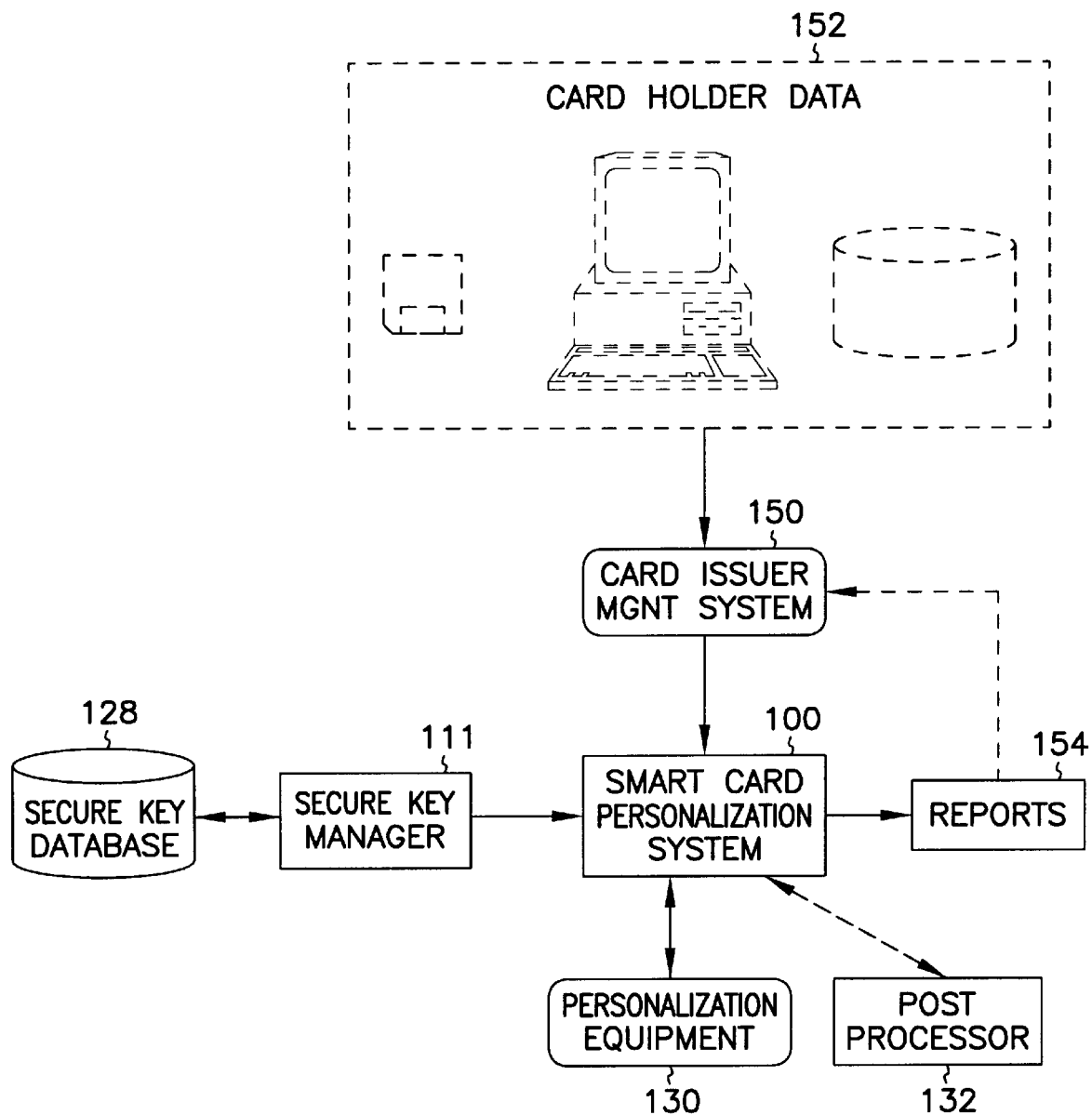
FIG. 1B is a functional block diagram of input and output connections for the smart card personalization system shown in FIG. 1A.

FIG. 1B is a block diagram of one embodiment of the smart card personalization system illustrating the logical connections between the smart card personalization system 100 and functions employed by a card issuing organization to issue smart cards. Card holder data maintained by the card issuing organization contains information about each individual card holder, such as name, account number, card expiration date, and applicable services. Various ways of inputting the card holder data into the card issuer management system 150 are shown in phantom as card holder data 152 in FIG. 1B. The card issuer management system 150 may receive the card holder data on computer media, such as magnetic tape, floppy disk, or CD ROM. Alternatively, the card holder data 152 may be input through an on-line connection such as a general switched telephone network, a packet-switched network, i.e., the Internet, a dedicated line, or a cable/satellite television signal. Additional ways in which the card holder data 152 may be input to the system 150 will be apparent to those skilled in the art.

In addition to the card issuer management system 150, the card issuer typically has an existing reporting capability 154 with which the smart card personalization system 100 interfaces so that the card issuer can review statistical information maintained by the system 100. An external security source, also provided by the card issuer and shown as secure key manager 111 and secure key database 128, provides security functions that work in conjunction with the card issuer management system 150 and the smart card personalization system 100. FIG. 1B also illustrates an alternate embodiment of the smart card personalization system 100 which supports a card issuer that has add-on smart card interface devices. The system 100 directs a portion of the personalization information to the older personalization equipment 130 and the remainder of the data to a post-processor 132 in the smart card interface device 132 which programs the chip. These functions are explained in detail below.

The embodiments of the software program for the smart card personalization system 100 shown in the following Figures function as combinations of code modules with each module executing a specific part of the issuing process. In these embodiments, the modules are coupled through defined input and output program calls, and are also coupled to the data structures through standard data query commands that provide access to the data stored in the data structures. The communication protocols between the modules, and between the modules and the data structures vary depending on the language in which the modules are written and upon the underlying data management system employed to support the database.

Figure 1C:
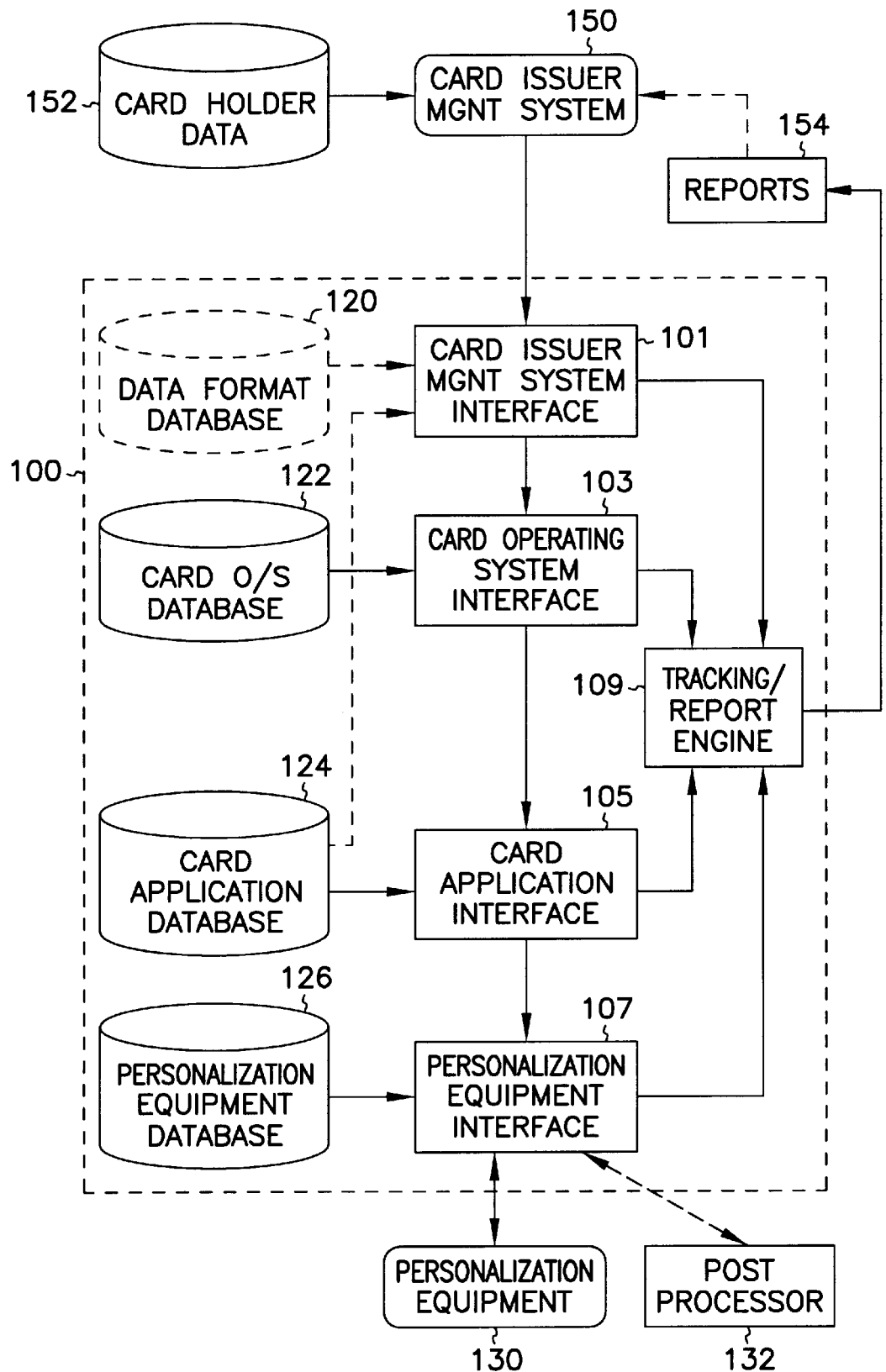
FIG. 1C is a functional block diagram showing software modules and data structures which comprise one embodiment of the smart card personalization system shown in FIG. 1B.

FIG. 1C is a more detailed functional block diagram of the smart card personalization system 100 of FIG. 1 B without the external security functions. FIG. 1C shows the internal connections between software modules and database records that enable the smart card personalization system 100 to combine multiple types of issuer data formats, card operating systems, card applications and personalization equipment when issuing smart cards.

The smart card personalization system 100 provides a customized card issuer management interface 101 to a card issuer management system 150. In this embodiment, the card issuer management system 150 passes personalization data from a card holder database 152 to the system 100. Each software module within system 100 expects the personalization data to be passed to it in a particular, internal format. Because the personalization data is in an external format defined by the card issuer that often differs from the internal format(s) expected by the software modules, the personalization data is translated by the system 100 into the internal format(s) using the data format template. The system 100 may acquire the data format template through a data format identifier passed by the card issuer that the system 100 uses to acquire an optional data format template record 120 (shown in phantom in FIG. 1C) as illustrated by an optional connection between the record 120 and the card issuer management system interface 101. Alternatively the card issuer passes the data format template record to the system 100 instead of the data format identifier. In another embodiment, the data format template may be derived from the data in the card application record 124 that is specified by an application program identifier passed by the issuer as illustrated by an optional connection between the card application database 124 and the card issuer management system interface 101.

In a further alternate embodiment of FIG. 1C, security functions are provided internal to the smart card personalization system 100, by passing security functions into the system as part of the card application record.

A further alternate embodiment in which the personalization data format matches the internal format is also shown in FIG. 1C. Because no translation between the external and internal formats is necessary in this embodiment, no data format template is needed so the data format record 120 and the connections between the card issuer management system interface 101 and the data format record 120 and the card application database 124 are not present. The data format record may 120 be composed of a plurality of tables which instruct the system 100 as to the proper parsing of the personalization data or a simple list that indicates the order in which the fields of the card holder data record appear as will be apparent to those skilled in the art. The various alternate procedures for determining the format of the personalization data described above are implicit in all the embodiments of the smart card personalization system 100 described herein.

Using a card identifier provided by the card issuer management system 150, a card operating system interface module 103 retrieves programming control commands specific to the card operating system 122 for the microprocessor chip that is embedded in the type of card being issued. The programming control commands direct the encoding of the chip with the personalization data and the card application(s) chosen by the card issuer.

Each card application comprises program code and variable data that is stored in the database as application data 124 and is identified by an application program identifier. The card issuer management system 150 passes one or more program application identifiers to the system 100 which are used by a card application interface module 105 to acquire the corresponding application data 124.

The personalization equipment that the card issuer plans to use to issue the batch of cards is defined by a personalization equipment identifier. A personalization equipment interface module 107 acquires equipment characteristic data 126 specific to the type of personalization equipment 130 corresponding to the personalization equipment identifier. The personalization equipment interface 107 also acquires the programming control commands, the application code and variables, and the translated personalization data, and transfers all of this data to the personalization equipment 130 as specified by the equipment characteristic data 126 to issue the smart card.

An alternate embodiment of the system 100 supports a card issuer that has augmented their existing personalization equipment with a smart card programming device by having the personalization equipment interface 107 direct a subset of the translated personalization information to the older personalization equipment 130 and the remainder of the data to a post-processor 132 in the smart card programming device.

The smart card personalization system 100 also provides a tracking/report module, or engine, 109 that collects statistical information from the other modules in the system 100 and formats the statistical information for output as hard-copy reports 154 or as input to a reporting function in the card issuer management system 150. Because this statistical information is being gathered in real-time, the card issuer management system 150 can interactively query tracking/report module 109 to obtain statistics about the smart card personalization system as it is executing. Examples of items monitored by the tracking/report module 109 are shown in FIG. 14.

Figure 2:
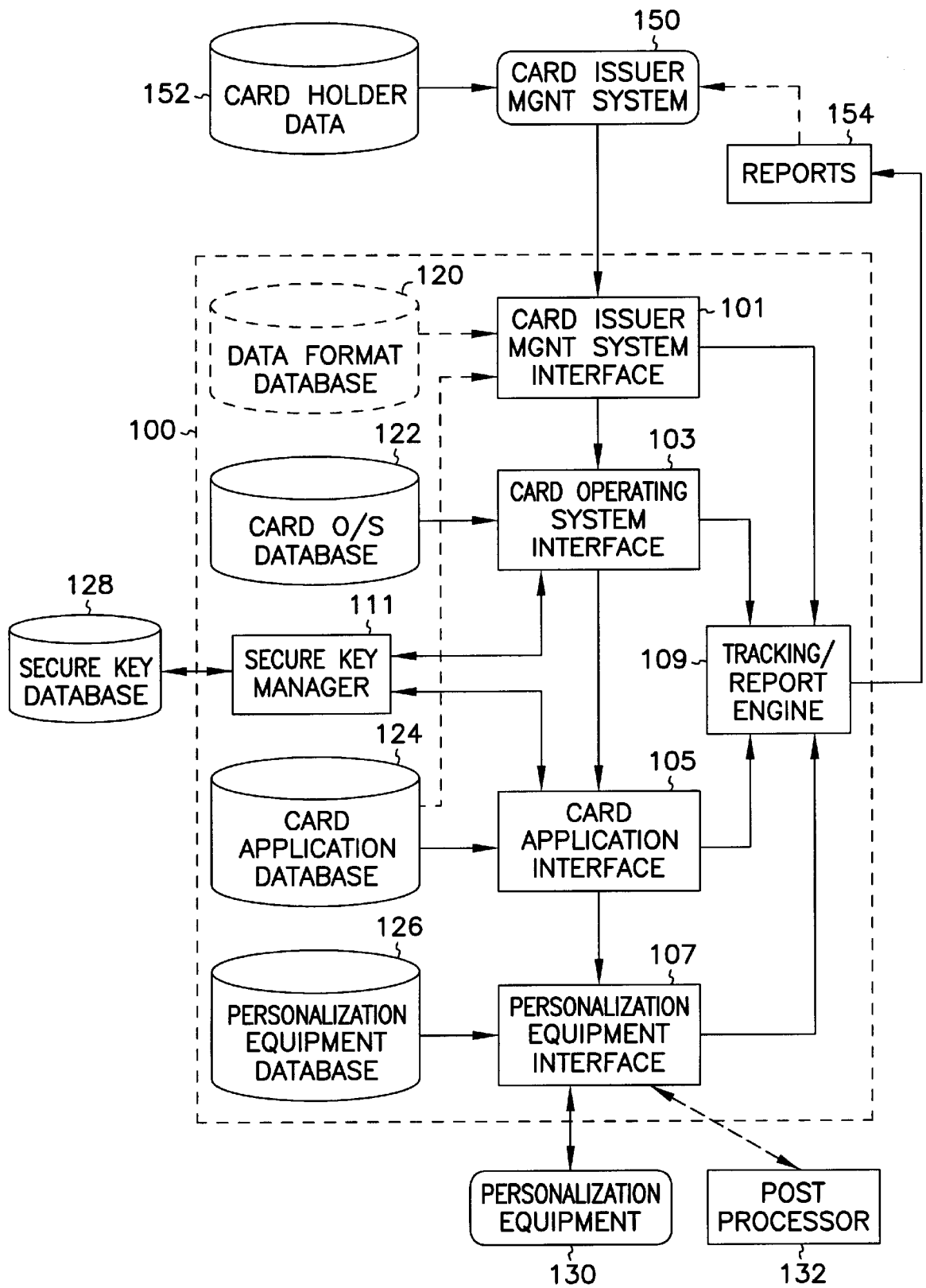
FIG. 2 is the functional block diagram of the embodiment of FIG. 1C with the addition of a security module to manage keys used for smart cards.

In an alternate embodiment shown in FIG. 2, the smart card personalization system 100 includes a security source in the form of a secure key manager module 111 and secure key database 128. When a smart card is manufactured, the vendor includes security architecture on the chip to prevent unauthorized programming. The security architecture implementation is commonly dependent on the application(s) programmed onto the chip. For example, the secure keys programmed in a stored value application would be different than the secure keys programmed in a health care application. The security architecture implementation also varies depending on the type of card: some cards require a single secure key which enables chip programming while others require multiple secure keys to enable chip programming and to perform additional security functions. FIG. 2 illustrates the basic functions of the secure key manager 111 when interfacing with the security architecture on a card that requires multiple secure keys.

As shown in FIG. 2, the secure key data is stored in the secure key database 128 which is external to the smart card personalization system 100 and maintained by the card issuer or other security source. Extending the secure key manager 111 to handle more or fewer secure keys, and to interface with a secure key database managed by the smart card personalization system 100 itself, is dependant on the application, operating system, and personalization equipment being used in the specific card issuing application, and will be apparent to those skilled in the art.

The secure key manager 111 also provides additional mechanisms to ensure secure key data authentication, data integrity and data secrecy. In one embodiment, secure key data authentication is accomplished through the implementation of various encryption methods. Secure key data integrity is achieved through digital signature mechanisms that use public keys to ensure that secure key data is being transmitted and received from valid sources. Secure key data secrecy is ensured by encrypting the transmitted data with a private key that is shared with the data receiver and which the data receiver uses to decrypt the data upon receipt.

After the system 100 receives a secure key record from the secure key database 128, the secure key manager 111, in conjunction with the card operating system interface 103 and the card application interface 105, perform the secure key authentication, data integrity and data secrecy functions. The system 100 then transfers the secure key data to the personalization equipment 130 through the personalization equipment interface 107 along with the other data for the card.

In an alternate embodiment, the secure key manager 111 passes security information to the other modules of the smart card personalization system 100. For example, portions of the card holder data, such as the PIN (Personal Identification Number) code, may be encrypted by the card issuer management system 150 prior to passing the data to the smart card personalization system 100. The card issuer management system interface 101 retrieves the encryption key from the secure key database 128 through the secure key manager 111, and decrypts the data prior to encoding or programming the PIN code into the magnetic stripe and/or the chip.

In a further alternate embodiment, the secure key manager 111 is a code "hook" into the smart card personalization system 100 which provides a gateway connection for an external security source that supplies the required security functions. An example of such an external security source is a security manager program written by a third party that manages a security database of secure keys and/or security functions similar to secure key database 128. The security functions may be either external routines executed by the security manager, or code modules passed by the security manager which are then executed by the smart card personalization system 100 to provide the required security functions, or a combination of both.

Figure 3:
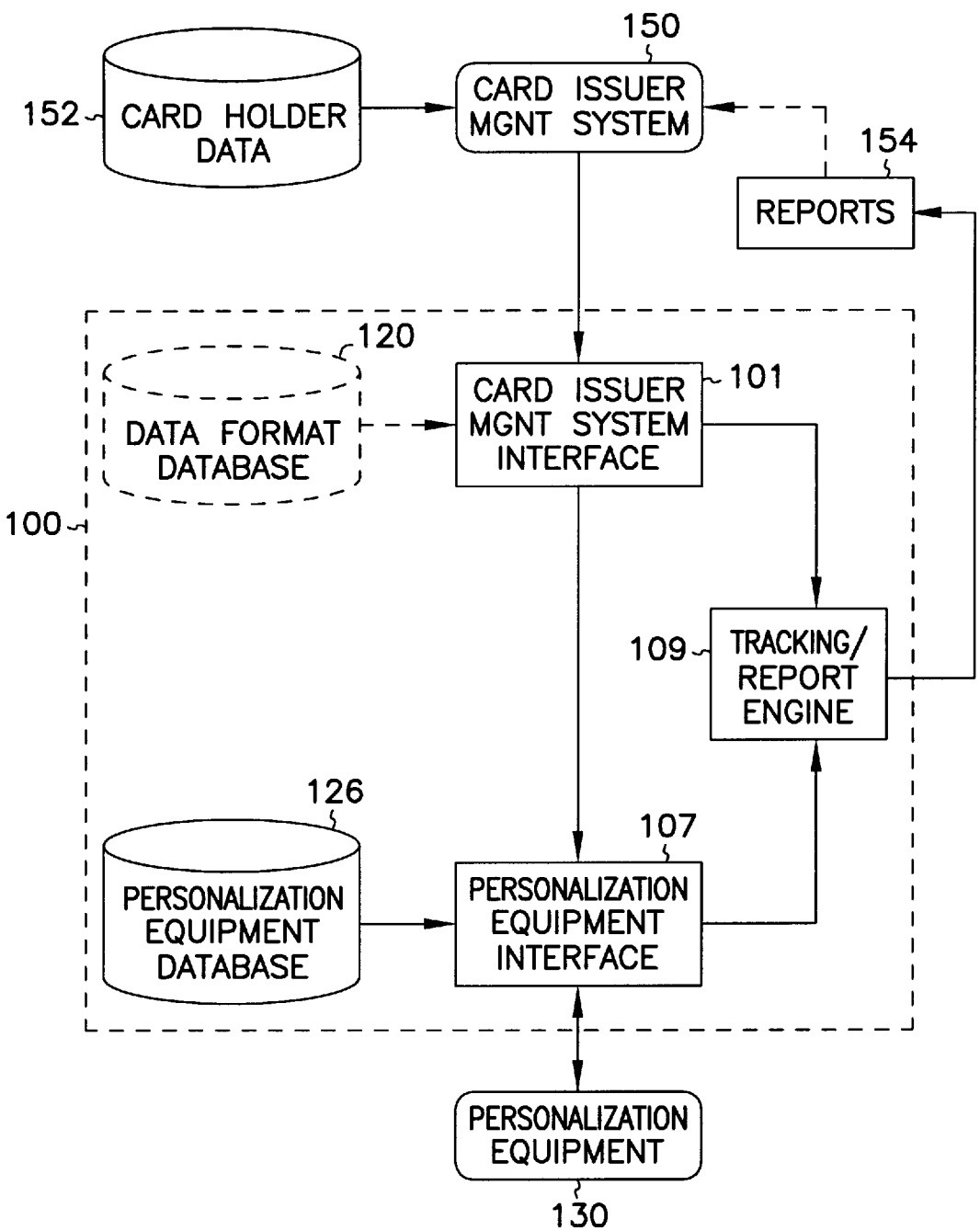
FIG. 3 is a functional block diagram of another embodiment of the smart card personalization system showing a minimal configuration to manage multiple types of cards and personalization equipment.

FIG. 3 illustrates a minimal configuration of the smart card personalization system 100. In this embodiment, only the card issuer management system interface modules 101 and the personalization equipment interface modules 107 are enabled in the software. This embodiment permits card issuer to use the system 100 to personalize non-smart cards, thus saving the cost of having two separate personalization systems, while permitting the card issuer to use multiple data formats and multiple types of personalization equipment. FIG. 3 also illustrates an additional alternate embodiment that includes the tracking/report module 109 as described above in conjunction with FIG. 1C.

In a still further alternate embodiment, the smart card personalization system 100 shown in FIG. 3 encodes data onto an optical transaction card when optical-encoding equipment is used as the personalization equipment 130.

Figure 4:
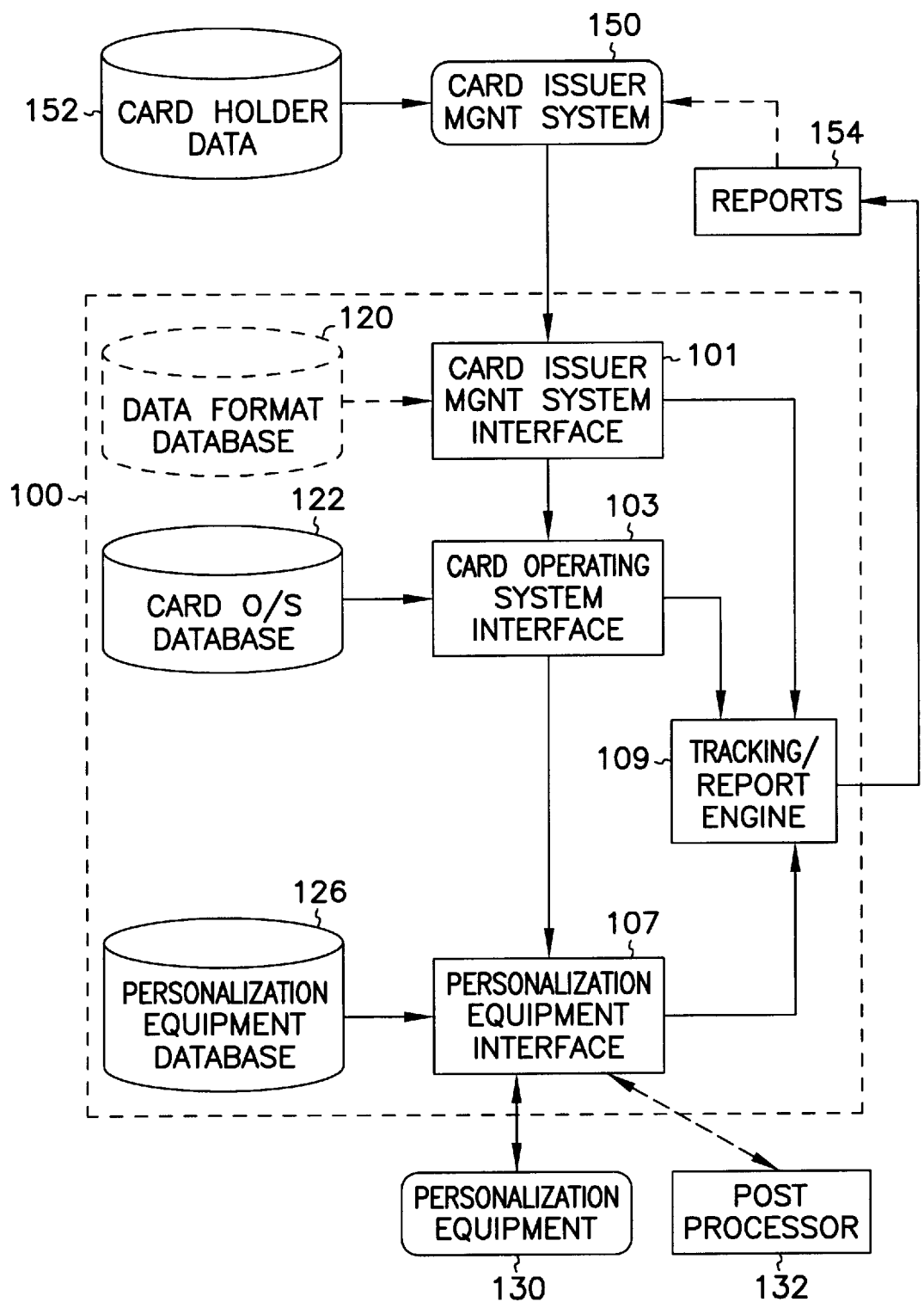
FIG. 4 is the functional block diagram of the embodiment of FIG. 3 with the addition of a module to manage multiple card operating systems.
Figure 5:
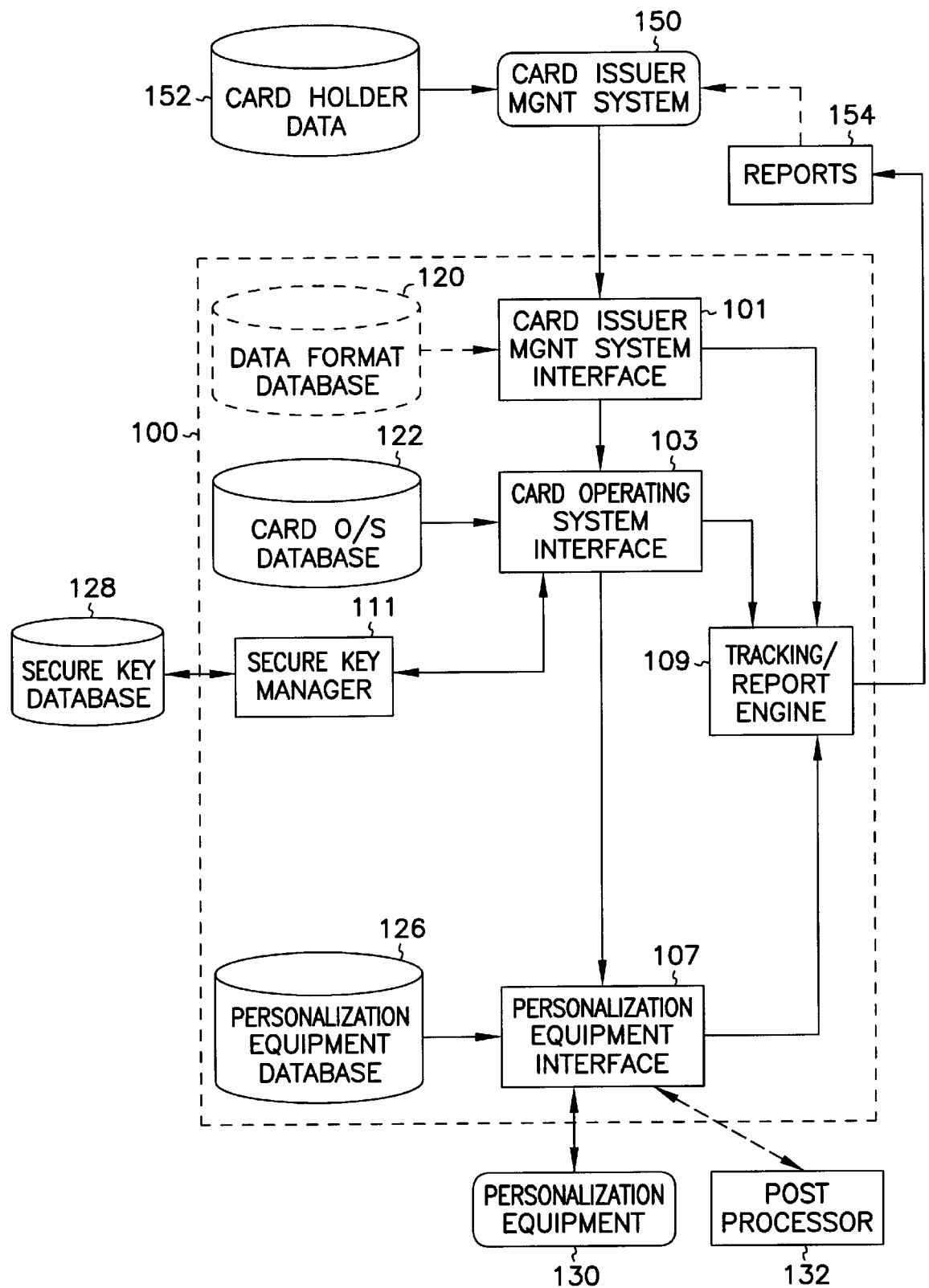
FIG. 5 is the functional block diagram of the embodiment of FIG. 4 with the addition of the security module.

FIGS. 4 and 5 depict still further alternate embodiments that are implemented when the card issuer does not program a card application on the smart card chip. These embodiments allow the card issuer to issue multiple card types with their attendant variety of operating systems on multiple types of personalization equipment without having to reconfigure the smart card personalization system 100. As described above in conjunction with FIG. 1C, FIG. 4 includes the modules that support reporting and post-processing. FIG. 5 illustrates the embodiments of FIG. 4 with the addition of the secure key manager module 111 that provides security to the card operating system interface 103 for transmission to the personalization equipment 130.

Figure 6:
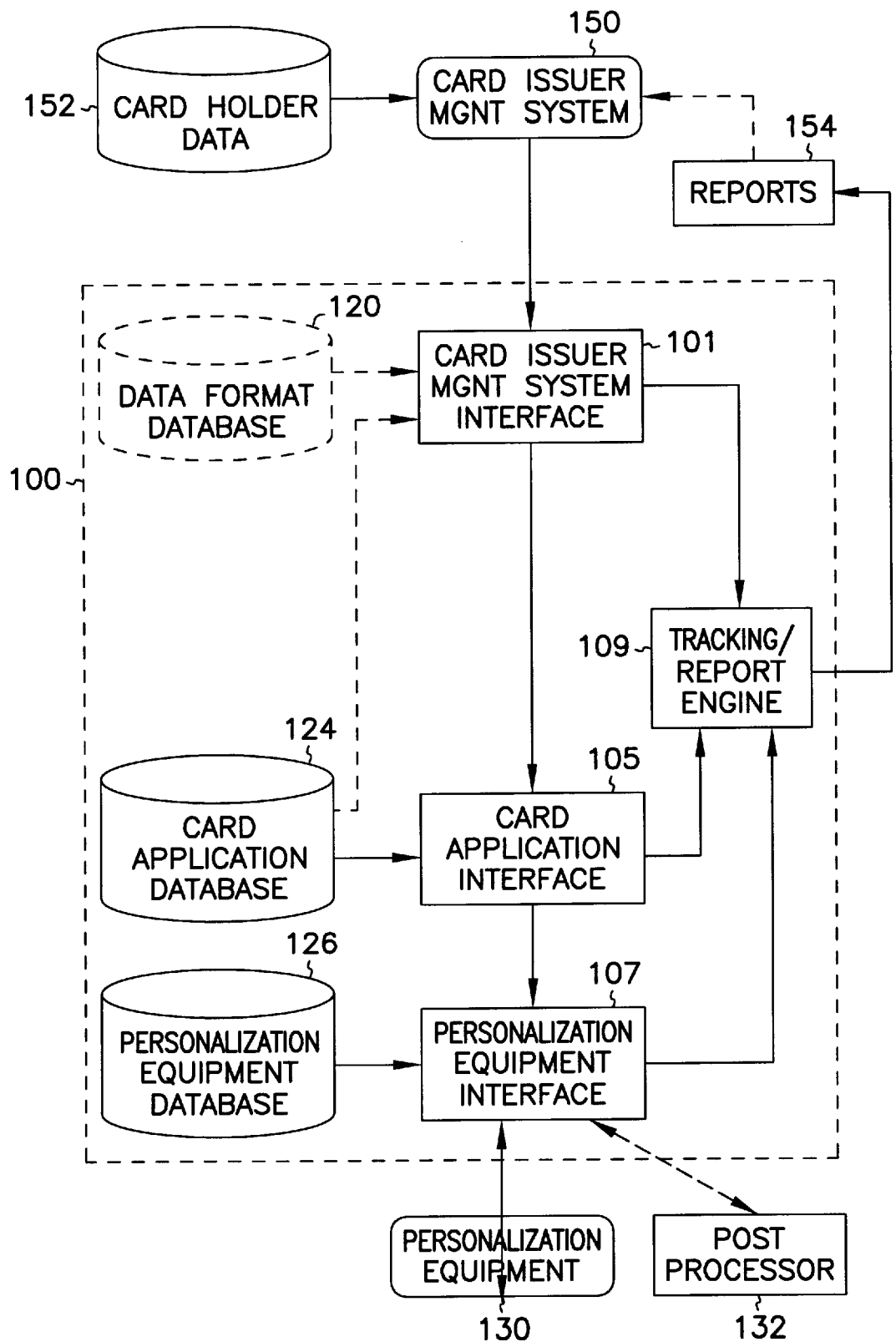
FIG. 6 is the functional block diagram of the embodiment of FIG. 3 with the addition of a module to manage multiple card applications.
Figure 7:
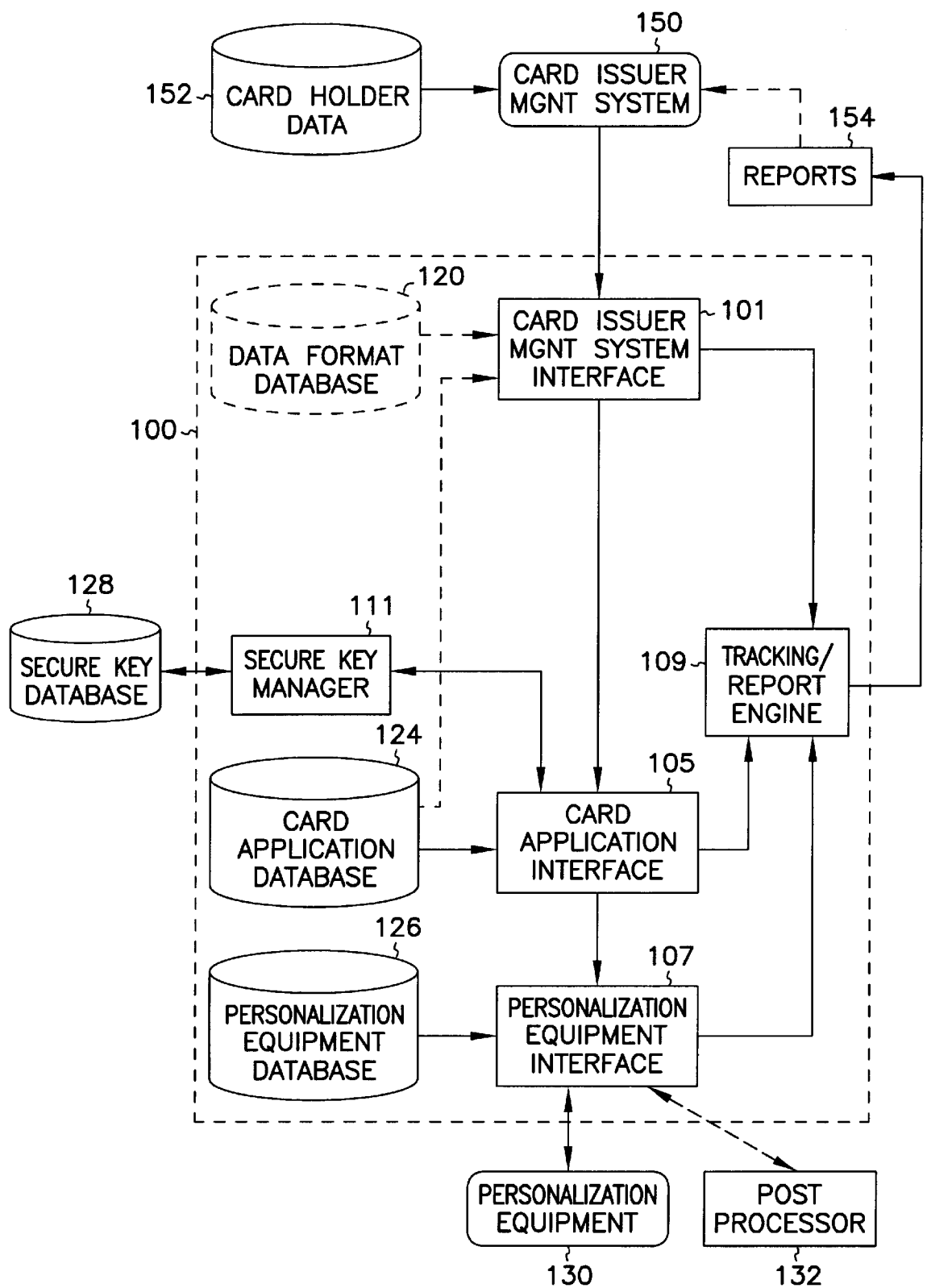
FIG. 7 is the functional block diagram of the embodiment of FIG. 6 with the addition of the security module.

Similarly, FIGS. 6 and 7 illustrate embodiments to support a card issuer that uses the chip on a smart card only as a data storage device for a card application, and so does not have an operating system executing on the chip. Smart card personalization system 100 supports multiple card applications for multiple card types issued with multiple types of personalization equipment. FIGS. 6 and 7 are analogous to FIGS. 4 and 5 except that the secure key manager 111 provides secure keys and/or functions to the card application interface 105 instead of the card operating system interface 103.

Figure 8A:
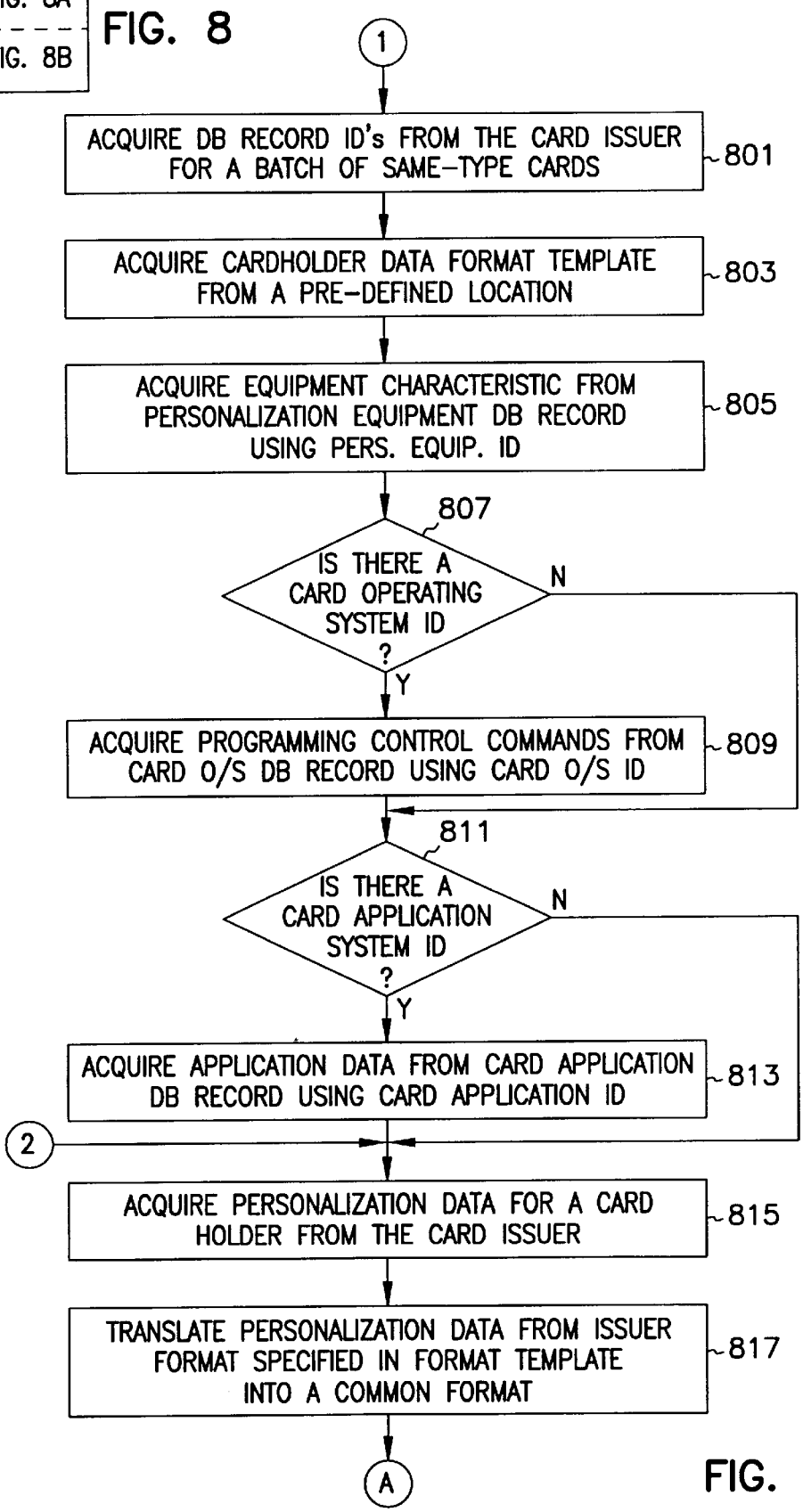
FIGS. 8A, B represent a high level flow chart for computer software which implements the functions of the smart card personalization system.
Figure 8B:
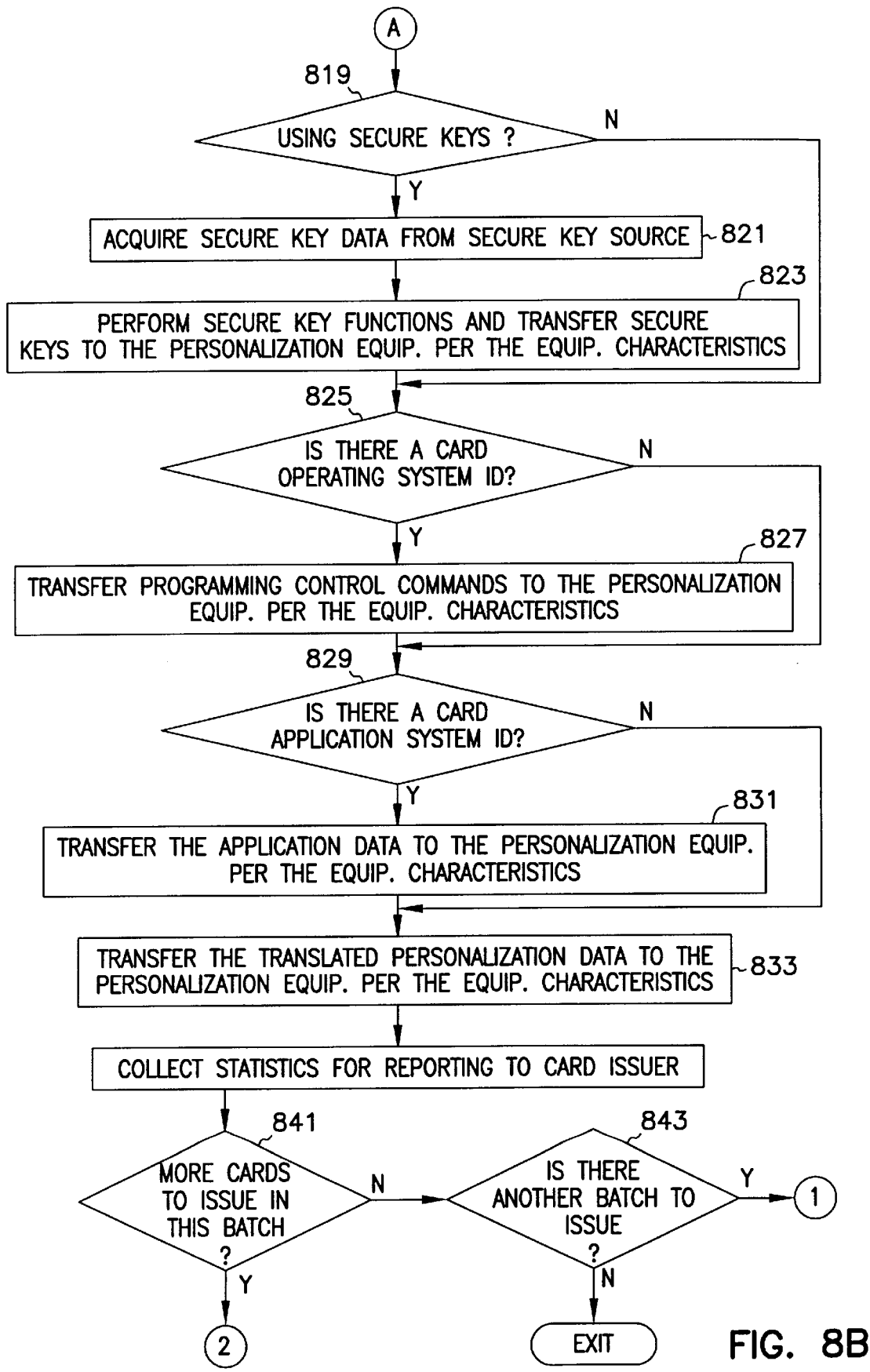

FIG. 8 is a high level flow chart for one embodiment of software which implements the functions of the smart card personalization system 100 described above. The software acquires a personalization equipment identifier for a batch of transaction cards to be issued from the card issuer management system at block 801. Depending on the type of cards to be issued, the software also acquires a program application identifier(s) and/or a card operating system identifier at the same time. The software then acquires the particular data format template corresponding to the format of the personalization data through one of the procedures described above (block 803). At block 805, the system acquires the equipment characteristics for the personalization equipment to be used to issue the batch of cards from the personalization equipment record specified by the personalization equipment identifier.

If a card operating system identifier was passed by the card issuer management system (block 807), the software retrieves the programming control commands from the card operating system database record corresponding to the card operating system identifier at block 809. Blocks 811 and 813 perform the same logic for a card application, retrieving the application data, such as code and/or variables, from the database. At this point, the software has acquired the common data necessary for all the cards in the batch and begins looping through the logic which issues cards for the individual cardholders.

The card issuer management system passes the personalization data for a single card holder to the software (block 815) which translates the data items from the format defined by the data format template into an internal format used by the modules of the smart card personalization system (block 817). If the card chip contains security architecture that requires secure keys (block 819), the software acquires the secure key data necessary to perform the secure key functions from the appropriate secure key source at block 821.

The software is now ready to transfer data to the personalization equipment to program the card. If the card is protected by secure keys, the secure key functions are performed and the secure key data is transferred at block 823. Then the programming control codes for the chip operating system, if applicable, are transferred (blocks 825 and 827); next the application code and/or variables are transferred if they are needed (blocks 829 and 831). Finally, the card holder's personalization data that was translated into the internal format is transferred (block 833).

After the data has been transferred to the card, the software adds the appropriate values to the statistics it collects for the card issuer management system at block 839. If more cards in the same batch remain to be issued (block 841), the software returns to block 815 and acquires the personalization data for the next card holder. Otherwise, the software determines if the card issuer management system has a different batch of cards to issue (block 843) and returns to block 801 to acquire the necessary information to repeat the cycle for the new batch. If no further cards are to be issued, the software exits.

The mechanisms by which the card issuer management system 150 passes the necessary data to the smart card personalization system 100 and the order in which the smart card personalization system processes the data from the card issuer management system may be changed without exceeding the scope of the invention. Different arrangements are dictated by the specific environment in which the system 100 operates as shown in the alternate embodiment illustrated in FIGS. 9 and 10.

Figure 9:
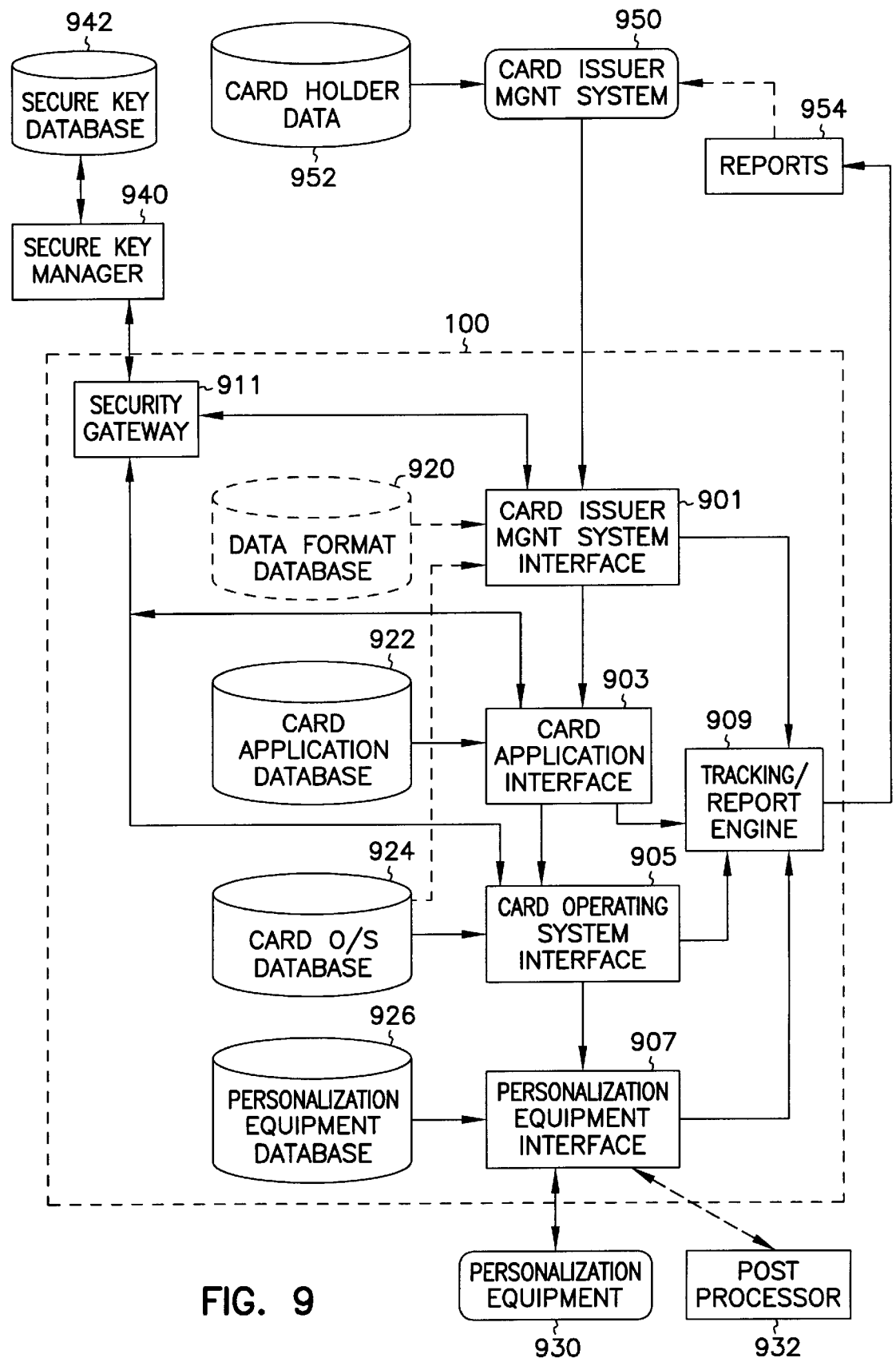
FIG. 9 is a functional block diagram of an alternate embodiment of the smart card personalization system using software modules and data records.

In FIG. 9, a security module 911 acts as a gateway into the smart card personalization system 100 for a security source such as security manager 940 and security database 942 shown in FIG. 1B as 111 and 128 respectively. The security manager 940 controls access to the security database 942 and connects into the security gateway 911 to perform the necessary security functions for the smart card personalization system 100. The security gateway 911 is coupled to the card issuer management system interface 901 which allows the interface 901 to request that the security manager 940 decrypt personalization data passed in an encryption format by the card issuer management system 950. The security gateway 911 is also coupled to the card application interface 903 and the card operating interface 905 so that it can supply the necessary secure keys and/or security functions to those interfaces as explained above in conjunction with FIG. 2.

Furthermore, the embodiment of the smart card personalization system 100 shown in FIG. 9 acquires the application data 922 specified by the application program identifier prior to acquiring the programming control commands specific to the card operating system 924 using the card identifier. This embodiment permits the personalization data and the application data to be translated into the internal format prior to retrieving the programming commands for the card operating system 924 and the equipment characteristic data 926, thus speeding the processing of each smart card.

Standard transaction cards have data printed and embossed on the surface of the card and/or data encoded in a magnetic stripe on the card. With a smart card, data may also be stored in an internal memory area within the microprocessor. The same data may be placed on the surface of the card, in the magnetic stripe and also in the chip memory. The exact configuration of the data in and on the card will vary depending on the type of smart card being issued and the requirements of the card issuer.

Figure 10B:
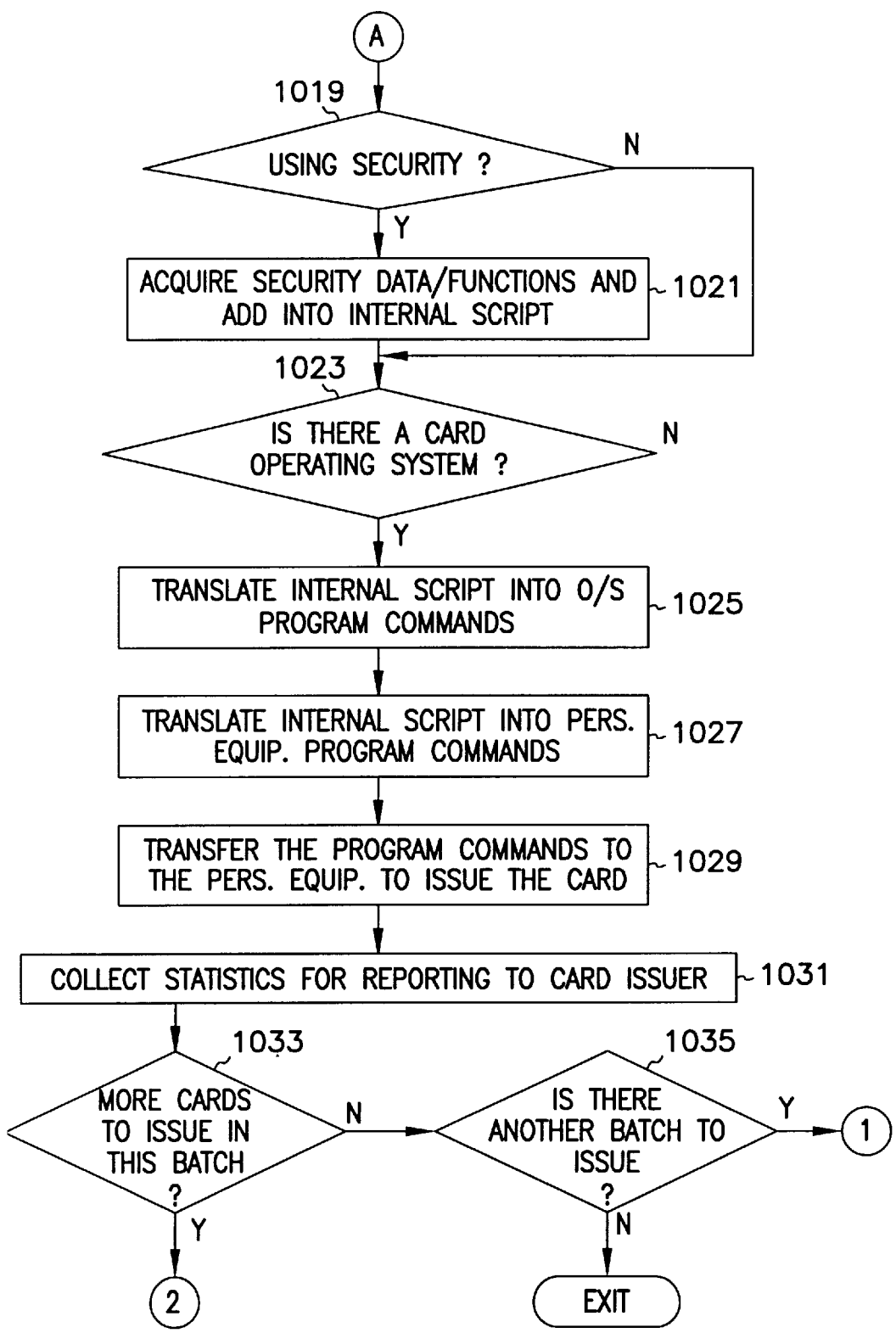
FIGS. 10A, B represent a high level flow chart for computer software which implements the functions of the embodiment of the smart card personalization system shown in FIG. 9.
Figure 13:
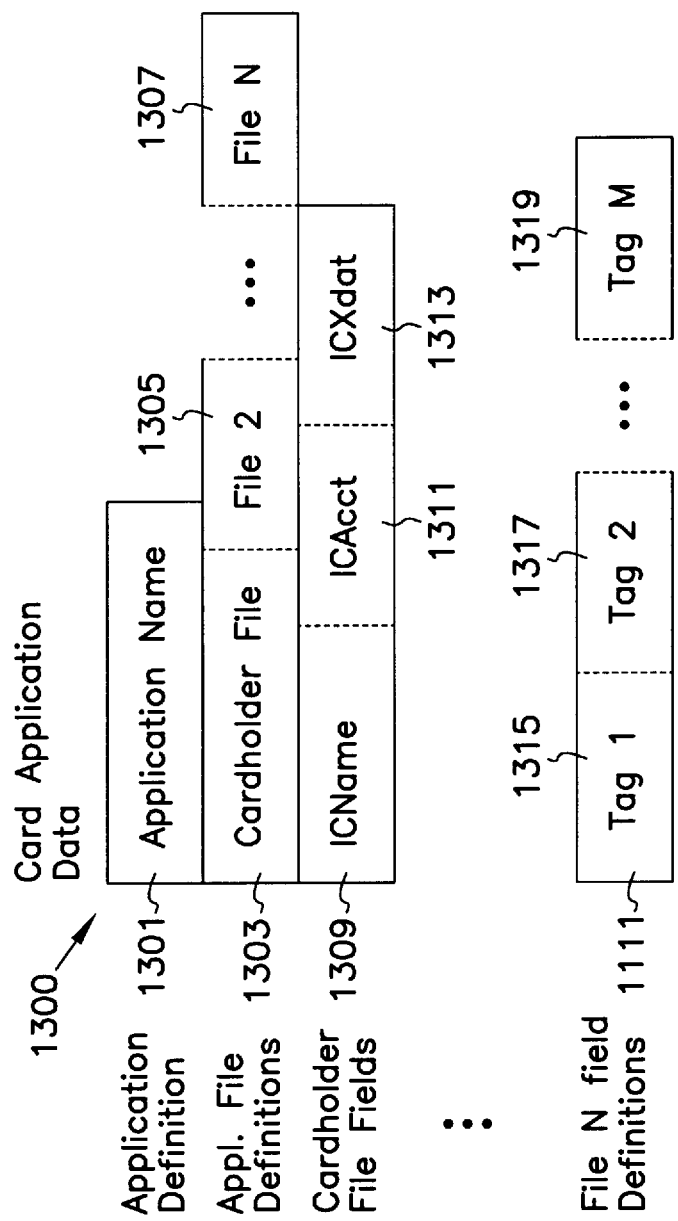
FIG. 13 is a data field chart for a card application data record used by the embodiment of the smart card personalization system shown in FIG. 9.

FIG. 10 is a high level flow chart of the embodiment shown in FIG. 9 and, in conjunction with FIGS. 11, 12 and 13, further illustrates how different mechanisms may be used to implement the smart card personalization system 100. The card issuer management system 950 passes a card framework template that defines the configuration of the smart card to the smart card personalization system 100 at block 1001.

FIG. 11 illustrates one embodiment of the data layout for the card framework template record 1100. The microprocessor chip identifier 101 and the card operating system identifier 1102 (if present) are specific to the type of smart card to be issued. The master file definition 1103 contains control information such as the chip source and the last date the chip was altered. The system file definitions 1104, 1105, 1107 contain addresses for the location of the system files within the memory of the chip. The system files are used by the card operating system and contain information such as the PIN code(s) for the card and applications, and algorithm tables. In the embodiment shown in FIG. 11, the master file and the system file definitions conform to the International Standards Organization (ISO) directive number 7816-4.

The next three sections of the card framework template record 1100 define the arrangement of data on the surface and magnetic stripe of the card. If information is to be printed on the card, such as the card holder's photograph 1109, the location on the surface of the card to print such data is passed by the card issuer management system 950 in the printing template of the card framework template record 1100. Similarly, the locations on the surface of the card to emboss data is passed in the emboss template, and the arrangement of the data to be encoded in the magnetic stripe is passed in the mag stripe template. The emboss data is illustrated in the card framework template record 1100 as the card holder's name (EMName) 1111, account number (EMAcct) 1113, and expiration date (EMXdat) 1115 and the magnetic stripe data by the account number (MSAcct) 1117 and the expiration date (MSXdat) 1119. The number of data items in the printing, emboss, and mag stripe templates will vary depending on the configuration of the smart card desired by the card issuer as will be apparent to those skilled in the art.

If the card issuer wants card applications programmed into the chip in the smart card, the card issuer passes the application program identifiers to the smart card personalization system 100 in the sections 1121, 1123, 1125 of the card framework template record 1100. Each application may have specific security functions associated with it (1127, 1129, 1131) and that information is also passed by the card issuer management system 950. The card framework template record 1100 also contains the personalization equipment identifier 1123 for the personalization equipment to be used to issue the smart cards.

In an alternate embodiment, the smart card personalization system 100 stores commonly used card framework template records in an internal database so that the card issuer management system 950 needs to pass only a card framework template identifier that identifies which card framework template record is to be used for a particular batch of cards.

The smart card personalization system 100 acquires the data format template for the personalization data from a pre-defined location specified by the card issuer at block 1003. If the card issuer has passed a data format identifier to the system 100, the data formate template record corresponding to the data format identifier is retrieved from the data format database 920. Alternatively, the card issuer may pass the data format template record itself. When neither the data format identifier nor the data format template record is passed to the system 100, the format of the personalization data is determined by the card application data as explained in more detail below.

An example of a data format template record is shown in FIG. 12. The data format template record 1200 defines an hypothetical layout of the personalization data records in the card holder database 952 in which the account number 1201 is the first field, the card holder's name 1202 is the second field, and the expiration date of the card 1205 is the third field. In one embodiment, the personalization data records are commadelimited records so no data field lengths are necessary to define the record format. Thus the data format template record 1200 shown in FIG. 12 completely defines the structure of the following example of a comma-delimited personalization data record to the smart card personalization system 100: 133444999922,Mary Jane Smith, 0299.

The smart card personalization system 100 acquires the application data for the card application, or applications, 922 corresponding to the application program identifiers, if any, that were passed by the card issuer management system 950 at block 1007. If no application program identifiers are passed, the smart card personalization system 100 acquires default application data (block 1008). The default and/or the application data in the card application data record(s) corresponding to the application program identifier(s) are inserted into the corresponding sections, i.e., 1121, 1123, 1125, of the card framework template record 1100.

One embodiment of the layout of a card application data record is shown in FIG. 13. The first field in the card application data record 1300 is the application name 1301. As with other computer-based application programs, a card application processes data from external sources such as an automatic teller machine or internal sources such as data files encoded into the microprocessor's memory. Using the smart card causes the appropriate application to be executed by the microprocessor and the application, in turn, accesses the internal files to retrieve or store data. To access internal data, the card application data record contains pointers to application files in the chip memory (1302, 1305, 1037) and also the location of fields within the application files. Some of the fields are initialized with data from the card holder database 952 when the card is issued. The application data 1300 includes an address 1303 to a card holder file located in the chip memory and defines the card holder file as containing three fields: the card holder's name (ICName) 1309, the account number (ICAcct) 1311 and the expiration date (ICXdat) 1313. Additional internal data is stored in other application files and the layout of those additional files is also defined by the application data 1300.

If the chip embedded in the smart card contains an operating system as specified by the card framework template record, the smart card personalization system 100 acquires a set of programming control commands for the operating system from the card operation system database 924 at block 1011. The programming control commands for each operating system includes commands for functions such as creating and accessing files in the memory of the chip, reading and writing records in the files located in chip 25 memory, along with security commands that authenticate PIN (Personal Identification Number) codes and control transactions that change monetary amounts stored in the chip.

The smart card personalization system 100 acquires the equipment characteristic data corresponding to the personalization equipment identifier in the card framework template record from the personalization equipment database 926 at block 1013. Included in the equipment characteristic data is a set of personalization programming control commands which control the operation of the personalization equipment. As is the case with the card operating systems, the personalization control commands are proprietary to the vendor of the equipment but typically include commands directed to the administration, formatting, and production of smart cards.

When the smart card personalization system 100 has acquired all the data necessary to define a smart card, it is ready to accept personalization data records 952 from the card issuer management system 950. As each personalization data record 952 is passed at block 1015, the smart card personalization system 100 uses the data format template, if present, to translate the personalization data into an internal format, and the card application data and card framework template to map the personalization data into variables in a command script written in an internal scripting language at block 1017. The translation and mapping process is described further below. Alternate embodiments which use a standard programming language such as Basic, Java or C instead of the internal scripting language are within the scope of the invention.

The smart card personalization system 1019 checks for security requirements for the various components of the smart card issuing process. In the embodiment of the card framework template shown in FIG. 11, the security requirements for the applications are specified by the card framework template record 1100 at block 1019. If there are security requirements, the smart card personalization system 100 acquires secure data and/or functions from the security manager 940 and adds the functions into the internal script at block 1021. An alternate embodiment of the smart card personalization system 100 passes the identifiers of the card operating system and the personalization equipment, as well as the application program identifier, to the security manager 940 which retrieves the appropriate security data and/or functions from the security database 942. The security functions typically use data from additional sources, including data stored in internal chip files, personalization data 952, the operating system database 924, the card application database 922, combined with the algorithm tables stored in the chip or from an external security module, such as the security manager 940, to perform the secure key authentication, data integrity, data secrecy and other security processes described above in conjunction with FIG. 2.

Once the internal command script is completed, it must be translated into the proprietary programming control commands native to the card operating system (if present) and to the personalization equipment so that the personalization data is transferred to the smart card. In this embodiment, the translation is performed by a script language interpreter at blocks 1025 and 1027 using the information acquired from the card operating system database 924 and the personalization equipment database 926.

At block 1029, the smart card operating system 100 passes the interpreted script to the personalization equipment which then executes the programming control commands to emboss/print, encode and program the appropriate personalization data onto the surface, and into the magnetic stripe and chip respectively of the smart card. As before, if the card issuer has elected to purchase an add-on smart card programming device to attach to its existing personalization equipment, an alternate embodiment of the smart card personalization system 100 directs the control commands for the embossing and encoding to the personalization equipment 930 and the control command for the chip to the post-processor 132 in the smart card programming device.

When the issue process has been completed for one card, the smart card personalization system 100 acquires the next personalization data record if there are additional cards of the same type waiting to issue (block 1033). Otherwise, the smart card personalization system determines if there is another batch of smart cards of a different type waiting to issue (block 1001) and begin the issuing process again by acquiring a new card framework template record from the card issuer.

The following example uses sample data to further describe the processing performed by the embodiment of the smart card personalization system 100 shown in FIGS. 9 and 10. The card issuer management system 950 requests the initiation of the issuing process by sending the smart card personalization system 100 a card framework template record, application program identifier(s), a card operating system identifier, a personalization equipment identifier, and optionally a data format template identifer or a data format template record. In this example, the card issuer management system 950 passes an application resource template record shown below that contains the identifiers The system 100 acquires a data format template using one of the procedures specified above and explained in more detail below in conjunction with the sample card holder data records.

| Application Resource Template Record |
|---|
| [A1]<br>DFT=CARD1.DFT<br>CAT=CARD1.CAT<br>CID=CHIPX.CID<br>CPT=CARD1.CPT<br>SOURCE=A1 |

The first statement in the record marks the beginning of information for a particular application, in this case application "A1". The next four statements define the identifiers for the card framework template record (DFT), the card application record (CAT), the card operating system record (CID) and the personalization equipment record (CPT). The final statement is the name of a file created by the card issuing management system 950 that contains the card holder data record(s). The card issuing management system 950 inputs the card holder data as either a single request or a 'batch' of requests for cards to be issued.

The system 100 retrieves the records corresponding to the identifiers from the database. The system 100 then uses the information contained in the card framework template and data format template to set up an internal "script," which it later interpretes into the specific commands contained in the card operating system and personalization equipment records that instruct the personalization equipment to process the personalization data and issue the card for each card holder.

Two sample card holder data records 952 are shown below.

| Cardholder Data Records |
|---|
| Smith,James^12653683091245^0998^041052^mmmm |
| Anderson,Sue^39485003984138^0297^110248^mmmm |

In these records, the format defined by the card issuer places the account name (card holder name) in the first field followed by the account number, expiration data, date of birth, and medical data.

The system 100 uses the data format template to interpret each card holder data record 952 as it is processed. The system 100 also uses the data format template and card application records 922 to validate the data 952 ensuring proper data and format. An example of a data format template corresponding to the format of the sample card holder records shown above is shown in the first line of the table below. The James Smith personalization data record is included in the table to show the correspondence between the data format template and the fields of the card holder data record. The data format template equates each field in the card holder record with an internal label, %1, %2, etc., which corresponds to the internal order used within the system 100.

| Data Format Template Record |
|---|
| \| %1 \| %2 \| %3 \| %4 \| %5 \| |
| Smith,James^12653683091245^0998^041052^mmmm |

The example shown above represents the simplest case in which the fields of a card holder data record 952 are arranged in the internal order used by the smart card personalization system 100. This one-to-one correspondence means that the system 100 does not have to translate the card holder data fields into the internal field order. In such a case, the data format template record is unnecessary. Thus, in a further alternate embodiment, the card issuer does not pass a data format identifier to the smart card personalization system 100, but instead passes an indicator, such as a flag, which informs the system 100 that no data format template is needed because the card holder data fields are in a one-to-one correspondence with the internal field order. The system 100 acts on the indicator by bypassing the translation step.

A more complex example shown next is one in which the fields of the card holder data record 952 and the data within the fields are out of order relative to the internal system order. In this case, translation is necessary.

| Cardholder Data in Issuer Format |
|---|
| 1234567891245 James Smith 0998 041052 mmmm |
| Cardholder Data Translated into Internal Format |
| Smith,James^12653683091245^0998^041052^mmmm |

The system 100 uses the data format template to translate the data fields into the internal order as shown above. The translation may result in the physical rearrangement of the data fields or may be a logical rearrangement in which the data format template is invoked as a key each time a field from the card holder data record is referenced by the system 100. Various data format templates designed to translate different arrangements of card holder data will be apparent to those skilled in the art as will the substitution of tables of field equivalences or a set of parsing instructions or other mechanisms for the simple table used above to illustrate this example.

The card framework template record describes the structure of the chip on the card. In the sample shown below, the $MF entry defines a root directory (3F00), while $DF entries define a medical application (5F20), and an accounting application (5F10). Within each directory are application-specific files defined by $EF entries, such as 6F00 containing the account name and 6F10 containing the account number. All file descriptive data resides in the card framework template and is referenced at various times during the smart card issuing process.

| Card Framework Template Record |
|---|
| $CHIP=3102,MEM=8192,SIZE=N10 |
| $MF PATH=x3F00,TAG=ROOT,TITLE='Root Directory',SIZE=D7194 |
| $DF PATH=x3F005F10,TAG=ACCT,TITLE='Acct Data', SIZE=D2048 |
| $DF PATH=x3F005F20,TAG=MED,TITLE='Medical',SIZE=D1024 |
| $EF PATH=x3F003100,TAG=ICCID,TITLE='Issuer ID',FORMAT=T,SIZE=D10 |
| $BF PATH=x3F005F205E00,TAG=MED1,TITLE='Medical profile',FORMAT=T,SIZE=D80 |
| $EF PATH=x3F005F106F00,TAG=NAME,TITLE='Acct Name',FORMAT=T,SIZE=A30 |
| $EF PATH=x3F005F106F10,TAG=ACCTID,TITLE='Account No.',FORMAT=T,SIZE=N14 |
| $EF PATH=x3F005F106F20,TAG=EXPIRE,TITLE=Expire Date',FORMAT=T,SIZE=N4 |
| $EF PATH=x3F005F106F30,TAG=BIRTH,TITLE='Account Holder Birthdate',FORMAT=T,SIZE=N6 |

The card application record 922 "maps" the card holder data 952 to the data fields used by the application. The sample card application record 922 shown below has its data entries arranged in the sequence in which they are processed by the smart card personalization system 100.

| Card Application Record |
|---|
| $VL ICCID VALUE=1234509876 |
| $VL MED1 %5,TYPE=A |
| $VL NAME %1,TYPE=A |
| $VL ACCTID %2,TYPE=N |
| $VL EXPIRE %3,TYPE=N |
| $VL BIRTH %4,TYPE=N |
| $VL FMTACCT %2(1–4)–%2(5–9)–%2(10–14) |

The ICCID entry contains the chip identifier. Each of remaining entries, except for FMTACCT, maps a "tag" to the field in the card holder data record 952 that contains the information (as defined in the data format template shown above) and specifies the type of data in the field. Thus, the MED1 tag represents the fifth field in the card holder data record 952 and the data is in alpha format. The FMTACCT entry breaks the second field in the card holder data record 952, i.e., the account number, into sections and inserts hyphens between the sections.

The card operating system record 924 contains the programming control commands necessary to program the chip on the card. The sample card operating system programming control commands shown below are taken from the ISO directive number 7816-4 and are not the internal proprietary commands of any particular card operating system.

| Card Operating System Record |
| --- |
| SELECT A0A4000002%F |
| WRITE A0D0%O%L%D |
| READ A0B0%O%L%D |
| RESET VALUE=xFF |

Each entry in the example record above contains a tag followed by the corresponding command in the native language of the card operating system. Variable parameter fields are indicated by "%" followed by a letter and are filled in with the appropriate card holder data as each individual card is processed.

The personalization equipment record 926 contains personalization equipment characteristic data, such as instructions that define the actual sequence and steps necessary to issue a complete card on a specific set of personalization equipment. The sample instructions used in this example are fictitious and do not represent the internal proprietary instructions for any particular personalization equipment.

| Personalization Equipment Record |
| --- |
| $EMBOSS |
|     #EMB#%FMTACCT%~%NAME% |
| $ENCODE |
|     #ENC#%%%ACCTID%~%NAME% |
| $IC |
|     #\@# |
|     @ICCID |
|     WRITE ICCID |
|     @NAME |
|     SELECT ACCT |
|     SELECT NAME |
|     WRITE NAME |
|     @ACCTID |
|     SELECT ACCTID |
|     WRITE ACCTID |
|     @EXPIRE |
|     SELECT EXPIRE |
|     WRITE EXPIRE |
| $PR |

As each card is issued, the personalization equipment characteristic data shown above is serially processed in four steps defined by the entries preceded by a "$." The card application record 922 is used to determine the value of the variable parameter fields in each instruction.

The $EMBOSS instruction is a single stream of data that begins with the control sequence #EMB# which notifies the personalization equipment that the data that follows should be embossed on the card. Each data field in the instruction is enclosed in a pair of percent signs. In this case, the first data field is FMTACCT, or the formatted account field as defined in the card application record 922. The system 100 searches the card application record 922 for the FMTACCT entry and creates the string "1265-36830-91245" from the second data field in the first sample card holder record 952. The next field, NAME, is taken from the first data field in the card holder record 952. Thus, the emboss instruction for the first sample card holder record 952 becomes #EMB%1265-36830-91245%%Smith,James%.

The $ENCODE instruction causes the system 100 to process the card holder data to be encoded on the magnetic stripe of the card in the same fashion as the emboss instruction. Additional control characters in accordance with following IATA (International Air Travel Association) and ISO standards are inserted into the command. The resulting instruction is #ENC#%%%12653683091245%%Smith,James%.

The $IC command specifies the information to be stored in the chip's memory. The card operating system record 924 is used to translate the instructions in the personalization equipment record into the programming control commands for the operating system. A control sequence, #/@#, is used to notify the personalization equipment that the data that follows is chip data. The first field to be stored is the chip identifier, ICCID. The system 100 interprets the WRITE tag in the personalization equipment record 926 in accordance with the command identified with the WRITE tag in the card operating system record 924. Since no offset value is specified in the application record 922 for the chip identifier entry, the default of "0000" is loaded into the %O variable parameter field. The %L variable parameter field is set to the value of the SIZE field in the $CHIP entry in the card framework template, i.e., "10" or hexadecimal "0A." The %D variable parameter field is set to the value of ICCID, "1234509876". The resulting command is A0D000000A1234509876.

The next commands cause the card operating system to store the card holder name into the account name file in the account directory on the chip. The system 100 translates the SELECT ACCT command into the corresponding card operating system command. The system 100 locates the SELECT entry in the card operating system record 924, the ACCT entry in the card framework template record, and substitutes the specified directory path for the account directory defined in the ACCT entry, i.e. "5F10," for the %F variable parameter field in the command defined in the SELECT entry. The resulting command is A0A40000025F10. Similarly, the SELECT NAME command causes the system 100 to substitute the account name file "6F00" for the %F variable parameter field. The resulting command is A0A40000026F00. The final command in this series is the WRITE command. The system 100 interprets the WRITE command by substituting the default offset of "0000" for %O, the value of the SIZE field, "30" or hex "1E," as defined by the NAME entry in the card framework template record for %L, and the card holder's name, "Smith, James" for the first sample card holder data record 952, for %D, to produce the command A0D000001ESmith, James~~~~~~~~~~~~~~~~~~ where each "~" represents a trailing space inserted to pad the name out to thirty characters.

The system 100 processes the remainder of the commands in the personalization equipment record 926 in a similar fashion to produce a contiguous string of data containing the commands to issue a card for the first sample card holder data record 952:

/@#A0D000000A123459876A0A40000025F10A0A40 0 0 0 0 2 6 F 0 0 A 0 D 0 0 0 0 0 1 E S m i t h , James~~~~~~~~~~~~~~~~~~~A0A40000026F10A0 A4000002E12653683091245A0A40000026 F2040998.

The $PR command causes the system 100 to send the command data stream to the personalization equipment.

The data layouts shown in FIGS. 11, 12 and 13, and the sample data discussed in conjunction with the above example are only examples used to illustrate the functioning of various embodiments of the smart card personalization system 100. That the layouts and data are necessarily defined by the environment in which they are used will be apparent to those skilled in the art.

As will also be apparent to those skilled in the art, the smart card personalization system 100 encompasses alternate embodiments of the software program in which the functions of the system are performed by modules different than those shown in the FIGS. The system 100 may process the data in a serial or parallel fashion, or a combination of the two, without departing from the spirit or scope of the invention. The software program may be written in one of several widely available programming languages and the modules may be coded as subroutines, subsystems, or objects depending on the language chosen. Similarly, data used by the system 100 is described and represented as logical records embodied in a database but the invention is not limited to the described arrangement of data records, nor is the use of any particular type of data management system implied. Relational database systems from vendors such as Oracle, Sybase, Informix, or Microsoft provide the necessary infrastructure for managing the underlying data in the system, whether it is centralized or distributed, but other organizational data structures, i.e., indexed flat files, may be substituted without exceeding the scope of the invention.

Furthermore, alternate embodiments of the invention which implement the system in hardware, firmware, or a combination of both hardware and software, as well as distributing the modules and/or the data in a different fashion will be apparent to those skilled in the art and are also within the scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for issuing portable programmed data carriers comprising:

acquiring a personalization equipment identifier and personalization data for a card holder from a card issuer management system;

acquiring equipment characteristic data for a personalization equipment type from a record in a database identified by the personalization equipment identifier; and transferring the personalization data to personalization equipment as specified by the equipment characteristic data for the type of personalization equipment to issue the data carrier.

2. The method of claim 1, further comprising translating the personalization data into an internal format such that the translated personalization data is transferred to the personalization equipment.

3. The method of claim 2, wherein the personalization data is translated from a format defined by the card issuer management system into the internal format in accordance with format template data.

4. The method of claim 3, further comprising acquiring the format template data from a record in the database identified by a data format identifier supplied by the card issuer management system.

5. The method of claim 3, further comprising acquiring the format template data from the card issuer management system.

6. The method of claim 3, further comprising acquiring the format template data from an application data record in the database identified by an application program identifier supplied by the card issuer management system.

7. The method of claim 1, further comprising:

collecting information regarding the issuing of the data carriers; and reporting statistics derived from the collected information to the card issuer management system.

8. The method of claim 1, further comprising:

acquiring an application program identifier from the card issuer management system;

acquiring application data from a record in the database identified by the application program identifier; and transferring the application data to the personalization equipment as specified by the equipment characteristic data.

9. The method of claim 1, further comprising:

acquiring security data from a security source; and transferring the security data to the personalization equipment as specified by the equipment characteristic data.

10. The method of claim 1, further comprising:

acquiring a card operating system identifier from the card issuer management system;

acquiring programming control commands from a record in the database identified by the operating system identifier; and transferring the programming control commands to the personalization equipment as specified by the equipment characteristic data.

11. The method of claim 10, further comprising:

acquiring an application program identifier from the card issuer management system;

acquiring the application data from a record in the database identified by the application program identifier; and transferring the application data to the personalization equipment as specified by the equipment characteristic data.

12. A system for issuing portable programmed data carriers comprising:

a card issuer management system interface for acquiring a personalization equipment identifier and personalization data for a card holder from a card issuer management system;

a personalization equipment interface for acquiring equipment characteristic data for a personalization equipment type from a record in a database identified by the personalization equipment identifier; and the personalization equipment interface for further transferring the personalization data to personalization equipment as specified by the equipment characteristic data for the type of personalization equipment to issue the data carrier.

13. The system of claim 12, wherein the system further acquires format template data from a record in a database identified by a data format identifier supplied by the card issuer management system and translates the personalization data into an internal format from a format defined by the format template data such that the personalization equipment interface transfers the translated personalization data to the personalization equipment.

14. The system of claim 12, further comprising a tracking/report engine for collecting data from the system regarding the issuing of the data carriers and for reporting the collected data to the card issuer management system.

15. The system of claim 12, further comprising:

a card application interface for acquiring application data from a record in the database identified by an application program identifier acquired by the card issuer management system interface; and the personalization equipment interface for further transferring the application data to the personalization equipment as specified by the equipment characteristic data.

16. The system of claim 12, further comprising a security manager for acquiring security data from a security source and transferring the security data to the personalization equipment interface.

17. The system of claim 12, further comprising:
a card operating system interface for acquiring programming control commands from a record in a database identified by a card operating system identifier acquired by the card issuer management system interface; and
the personalization equipment interface for further transferring the programming control commands to the personalization equipment as specified by the equipment characteristic data.

18. The system of claim 17, further comprising:
a card application interface for acquiring application data from a record in the database identified by an application program identifier acquired by the card issuer management system interface; and
the personalization equipment interface for further transferring the application data to the personalization equipment as specified by the equipment characteristic data.

19. A data structure stored on a storage device for producing portable programmed data carriers comprising a plurality of personalization equipment elements, wherein each personalization equipment element is addressed by a unique personalization equipment identifier and specifies operating parameters for a type of personalization equipment such that the personalization data is properly formatted for transmission to the personalization equipment used to issue the data carrier.

20. The data structure of claim 19, further comprising a plurality of data format elements, wherein each data format element is addressed by a unique data format identifier and specifies a template used by a card issuer to format personalization data.

21. The data structure of claim 19, further comprising a plurality of card operating system elements, wherein each card operating system element is addressed by a unique card operating system identifier and specifies programming control commands for transmission to the personalization equipment.

22. The data structure of claim 19, further comprising a plurality of application program elements, wherein each application program element is addressed by a unique application program identifier and specifies application data used by a particular type of application program for transmission to the personalization equipment.

23. The data structure of claim 22, further comprising a plurality of card operating system elements, wherein each card operating system element is addressed by a unique card operating system identifier and specifies programming control commands for transmission to the personalization equipment.

24. A system for issuing portable programmed data carriers comprising:
personalization equipment receiving a data stream and in response thereto personalizing portable programmed data carriers;
personalization data obtained from a card issuer management system; and
a smart card personalization system having a database containing one or more data elements selected from the group consisting of
data format template elements,
card application data elements,
card operating system elements,
and personalization equipment elements,
wherein the smart card personalization system outputs the data stream as a result of processing the personalization data as directed by at least one of the selected data elements.

25. A method for issuing portable programmed data carriers comprising:
acquiring personalization data for a card holder and equipment characteristic data; and
transferring the personalization data to personalization equipment as specified by the equipment characteristic data to issue the data carrier.

26. A system for issuing portable programmed data carriers comprising a system interface for acquiring personalization data for a card holder and equipment characteristic data, and for further transferring the personalization data to personalization equipment as specified by the equipment characteristic data to issue the data carrier.

* * * * *

US005889941C1

(12) EX PARTE REEXAMINATION CERTIFICATE (7800th)
United States Patent
Tushie et al.

(10) Number: US 5,889,941 C1
(45) Certificate Issued: Oct. 12, 2010

(54) SYSTEM AND APPARATUS FOR SMART CARD PERSONALIZATION

(75) Inventors: David R. Tushie, Eden Prairie, MN (US); William W. Haeuser, Chaska, MN (US)

(73) Assignee: Card Technology Corporation, Paramus, NJ (US)

Reexamination Request:
No. 90/008,520, Mar. 19, 2007

Reexamination Certificate for:
Patent No.: 5,889,941
Issued: Mar. 30, 1999
Appl. No.: 08/755,459
Filed: Nov. 22, 1996

Related U.S. Application Data

(60) Provisional application No. 60/015,743, filed on Apr. 15, 1996.

(51) Int. Cl.
G07F 7/10 (2006.01)

(52) U.S. Cl. ............. 726/26; 235/380; 257/679
(58) Field of Classification Search ........... None
See application file for complete search history.

(56) References Cited

U.S. PATENT DOCUMENTS

| | | |
|---|---|---|
| 4,747,706 A | 5/1988 | Duea |
| 4,837,422 A | 6/1989 | Dethloff et al. |
| 4,968,873 A | 11/1990 | Dethloff et al. |
| 5,036,461 A | 7/1991 | Elliott et al. |
| 5,065,429 A | 11/1991 | Lang |
| 5,268,963 A | 12/1993 | Monroe et al. |
| 5,461,217 A | 10/1995 | Claus |
| 5,617,528 A | 4/1997 | Stechmann et al. |
| 5,721,781 A | 2/1998 | Deo et al. |
| 5,889,941 A | 3/1999 | Tushie et al. |
| 5,959,276 A | 9/1999 | Iijima |
| 6,014,748 A | 1/2000 | Tushie et al. |
| 6,038,551 A | 3/2000 | Barlow et al. |
| 6,335,799 B1 | 1/2002 | Provost |
| 2007/0118474 A1 | 5/2007 | Tushie et al. |

FOREIGN PATENT DOCUMENTS

| | | |
|---|---|---|
| DE | 3728860 | 3/1988 |
| DE | 3809028 | 9/1988 |
| DE | 3927270 | 2/1991 |
| DE | 19536548 | 9/1995 |
| DE | 69514472 T | 5/2000 |
| EP | 266926 A2 | 5/1988 |

(Continued)

OTHER PUBLICATIONS

US 7,184,856, 2/2007, Tushie et al. (withdrawn)
"PCT Application No. PCT/US 97/06204 International Search Report", (Aug. 21, 1997), 4 pages.
"PCT Application No. PCT/US 97/06204 International Preliminary Examination Report", (Jan. 6, 1999),5 pages.
"PCT Application No. PCT/US 97/06204 Written Opinion", (Sep. 11, 1998),4 pages.
"Retailing's entrepreneurs of the Year", *Chain Store Age Executive*, 70(12), (Dec. 1994),25 pages.

*Primary Examiner*—Albert J Gagliardi

(57) ABSTRACT

A smart card personalization system maintains a database containing card issuer data format templates, card applications, card operating system commands, and personalization equipment specifications and provides a centralized interface of inputs and outputs to a card issuing process which dynamically adjusts to changes in the issuing process to easily permit a card issuer to change data formats, card applications, card operating systems and/or personalization equipment in a card issuing process. The system interfaces to any card issuer management system, manages the transfer of card holder data and card applications to the particular personalization equipment used, and maintains statistics for real-time and off-line inquiries to support critical management and reporting functions. Furthermore, the system works with a variety of security methodologies to prevent fraud.

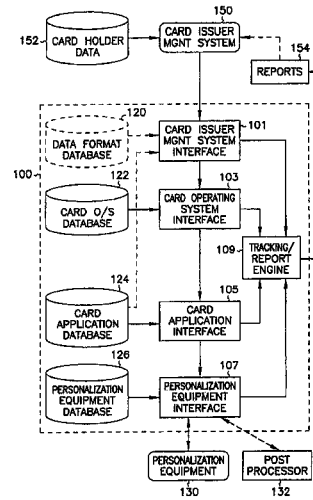

FOREIGN PATENT DOCUMENTS

| | | |
|---|---|---|
| EP | 0430257 A2 | 6/1991 |
| EP | 466969 A1 | 1/1992 |
| EP | 0706150 A1 | 4/1996 |
| EP | 778553 | 6/1997 |
| FR | 2638002 | 4/1990 |
| JP | 1-106365 | 4/1989 |
| JP | 5-314322 | 11/1993 |
| JP | A 314322/1993 | 11/1993 |
| JP | 06-119501 | 4/1994 |
| JP | A 06 119501 | 4/1994 |
| JP | 6-302180 | 10/1994 |
| JP | 07-311820 | 11/1995 |
| JP | 7-334631 | 12/1995 |
| WO | WO-8604170 A1 | 7/1986 |
| WO | WO-8707060 A1 | 11/1987 |
| WO | WO-8901413 | 2/1989 |
| WO | WO-9304433 A1 | 3/1993 |
| WO | WO-9307697 A1 | 4/1993 |
| WO | WO-9415306 A1 | 7/1994 |
| WO | WO-95/22810 | 8/1995 |
| WO | WO-9619355 A1 | 6/1996 |
| WO | WO 97/39424 | 10/1997 |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 25 and 26 is confirmed.

Claim 24 is cancelled.

New claims 27-47 are added and determined to be patentable.

Claims 1-23 were not reexamined.

27. The method of claim 25, wherein the personalization equipment comprises older personalization equipment and a post-processor, wherein a first portion of the personalization data is transferred to the older personalization equipment; and wherein a second portion of the personalization data is transferred to the post-processor.

28. The method of claim 25, wherein the equipment characteristic data comprises commands to control operation of the personalization equipment.

29. The method of claim 25, further comprising translating the personalization data into an internal format such that the translated personalization data is transferred to the personalization equipment.

30. The method of claim 29, wherein the personalization data is translated from a format defined by a card issuer management system into the internal format in accordance with format template data.

31. The method of claim 30, further comprising acquiring the format template data from a record in a database identified by the card issuer management system.

32. The method of claim 30, further comprising acquiring the format template data from the card issuer management system.

33. The method of claim 30, further comprising acquiring the format template data from an application data record in a database identified by the card issuer management system.

34. The method of claim 25, further comprising:
collecting information regarding the issuing of the data carriers; and
reporting statistics derived from the collected information to a card issuer management system.

35. The method of claim 25, further comprising:
acquiring an application program identifier from a card issuer management system;
acquiring application data from a record in a database identified by the application program identifier; and
transferring the application data to the personalization equipment as specified by the equipment characteristic data.

36. The method of claim 25, further comprising:
acquiring security data from a security source; and
transferring the security data to the personalization equipment as specified by the equipment characteristic data.

37. The method of claim 25, further comprising:
acquiring a card operating system identifier from a card issuer management system;
acquiring programming control commands from a first record in a database; and
transferring the programming control commands to the personalization equipment as specified by the equipment characteristic data.

38. The method of claim 37, further comprising:
acquiring an application program identifier from the card issuer management system;
acquiring application data from a second record in the database; and
transferring the application data to the personalization equipment as specified by the equipment characteristic data.

39. The system of claim 26, wherein the personalization equipment comprises older personalization equipment and a post-processor, wherein a first portion of the personalization data is transferred to the older personalization equipment; and wherein a second portion of the personalization data is transferred to the post-processor.

40. The system of claim 26, wherein the equipment characteristic data comprises commands to control operation of the personalization equipment.

41. The system of claim 26, further comprising a tracking/report engine for collecting data from the system regarding the issuing of the data carriers and for reporting the collected data to a card issuer management system.

42. The system of claim 26, further comprising:
a card application interface for acquiring application data from a record in a database; and
the system interface for further transferring the application data to the personalization equipment.

43. The system of claim 26, further comprising a security manager for acquiring security data from a security source and transferring the security data to the system interface.

44. The system of claim 26, further comprising:
a card operating system interface for acquiring programming control commands from a record in a database; and
the system interface for further transferring the programming control commands to the personalization equipment.

45. The system of claim 44, further comprising a security manager to provide at least one security key to the card operating system interface.

46. The system of claim 44, further comprising:
a card application interface for acquiring application data from a record in the database; and
the system interface for further transferring the application data to the personalization equipment.

47. The system of claim 46, further comprising a security manager to provide at least one security key to the card application interface.

* * * * *